US011388996B2

(12) United States Patent
Chen et al.

(10) Patent No.: US 11,388,996 B2
(45) Date of Patent: Jul. 19, 2022

(54) SLIDABLE CABINET PULLOUT APPARATUS AND METHOD OF USE

(71) Applicant: Hardware Resources, Inc., Bossier City, LA (US)

(72) Inventors: Alan Chen, Lewisville, TX (US); Marisa Sanchez, Shreveport, LA (US)

(73) Assignee: Hardware Resources, Inc., Bossier City, LA (US)

( * ) Notice: Subject to any disclaimer, the term of this patent is extended or adjusted under 35 U.S.C. 154(b) by 0 days.

(21) Appl. No.: 16/948,016

(22) Filed: Aug. 27, 2020

(65) Prior Publication Data

US 2022/0061524 A1 Mar. 3, 2022

(51) Int. Cl.

| | |
|---|---|
| ***A47G 21/14*** | (2006.01) |
| ***A47B 88/00*** | (2017.01) |
| ***A47B 77/04*** | (2006.01) |
| ***A47B 77/14*** | (2006.01) |
| ***A47B 77/10*** | (2006.01) |
| ***A47B 88/956*** | (2017.01) |
| ***A47B 88/407*** | (2017.01) |

(Continued)

(52) U.S. Cl.

CPC .............. *A47B 77/14* (2013.01); *A47B 77/10* (2013.01); *A47B 77/18* (2013.01); *A47B 88/407* (2017.01); *A47B 88/956* (2017.01); *A47G 21/14* (2013.01); *A47B 2210/0054* (2013.01); *F16B 1/00* (2013.01); *F16B 2001/0035* (2013.01)

(58) Field of Classification Search

CPC ....... A47B 88/42; A47B 88/956; A47B 77/14; A47B 88/407; A47B 77/10; A47B 77/18; A47B 2210/0054; A47G 21/14

See application file for complete search history.

(56) References Cited

U.S. PATENT DOCUMENTS

| | | | | |
|---|---|---|---|---|
| 2,314,157 A * | 3/1943 | O'Brien | ............... | A47B 77/022 4/631 |
| 2,418,919 A | 4/1947 | Benson | | |

(Continued)

FOREIGN PATENT DOCUMENTS

| | | |
|---|---|---|
| EP | 2022370 A1 | 2/2009 |
| EP | 2476341 B1 | 7/2014 |

(Continued)

OTHER PUBLICATIONS

Rev-A-Shelf 448KB Cleaning Instructions, Rev-A-Shelf, rev-a-shelf.com, [Document Modified: Feb. 2, 2016 12:53:15].

(Continued)

*Primary Examiner* — Kimberley S Wright

(74) *Attorney, Agent, or Firm* — Schultz & Associates, P.C.

(57) ABSTRACT

A kitchen pullout for storage of knives, cutting boards, and miscellaneous utensils and appliances is provided. A magnetic bar, having a specialized magnetic array is provided for storage of metallic knives. A specialized rubber casting, having a plurality of serpentine slots for holding ceramic knives is provided. Conveniently placed canisters and slots are provided for closed storage of kitchen utensils. A bottom shelf is provided with various heights for storage of appliances. An adjustable base frame, and an adjustable top rail is provided to secure and accommodate position the mechanism in the cabinet carcass.

17 Claims, 22 Drawing Sheets

(51) Int. Cl.
*A47B 77/18* (2006.01)
*F16B 1/00* (2006.01)

(56) References Cited

U.S. PATENT DOCUMENTS

| | | | | | |
|---|---|---|---|---|---|
| 2,839,349 | A | | 6/1958 | Culver | |
| 3,423,144 | A | * | 1/1969 | Patterson | A47G 21/14 312/280 |
| 3,544,182 | A | * | 12/1970 | Tainter | A47B 77/04 312/237 |
| 4,082,386 | A | | 4/1978 | Beasley | |
| 4,305,629 | A | | 12/1981 | Friis | |
| 4,960,307 | A | * | 10/1990 | Nelsen | A47B 63/00 312/194 |
| D333,238 | S | | 2/1993 | Stead et al. | |
| 5,655,672 | A | | 8/1997 | Stuchlik | |
| D411,718 | S | | 6/1999 | Davis et al. | |
| 6,216,888 | B1 | * | 4/2001 | Chien | B23Q 3/1546 211/70.6 |
| 6,769,751 | B1 | | 8/2004 | Harbison | |
| D504,054 | S | | 4/2005 | Mcguyer | |
| 7,306,301 | B2 | | 12/2007 | Walburn | |
| D596,424 | S | * | 7/2009 | Noe | D6/678.1 |
| D621,227 | S | | 8/2010 | Connor | |
| 7,775,380 | B2 | | 8/2010 | Yang et al. | |
| 7,802,688 | B1 | * | 9/2010 | Ruan | A47G 21/14 211/70.7 |
| 7,921,524 | B2 | * | 4/2011 | Maurer | H01F 7/0278 24/303 |
| 8,622,493 | B2 | * | 1/2014 | Roeck | A47B 77/18 312/348.4 |
| 8,733,865 | B1 | * | 5/2014 | Chambers | A47B 88/42 312/334.24 |
| 8,936,225 | B2 | | 1/2015 | Bradbury | |
| 8,939,526 | B1 | * | 1/2015 | Chambers | A47B 77/18 312/348.4 |
| 9,049,930 | B1 | * | 6/2015 | Chambers | A47B 77/18 |
| 9,565,936 | B2 | * | 2/2017 | Chen | A47B 88/57 |
| 9,723,922 | B2 | * | 8/2017 | Chen | A47B 88/57 |
| 9,756,941 | B1 | * | 9/2017 | Rowland | A47B 88/40 |
| 9,848,700 | B2 | * | 12/2017 | Corless | A47B 96/00 |
| 10,251,480 | B2 | * | 4/2019 | Chen | A47B 88/42 |
| 10,499,736 | B2 | * | 12/2019 | Chen | A47B 88/956 |
| 10,548,423 | B1 | | 2/2020 | Rigas | |
| 10,799,020 | B1 | * | 10/2020 | Tingle | A47B 95/00 |
| 2004/0084571 | A1 | | 5/2004 | Liu | |
| 2006/0001337 | A1 | * | 1/2006 | Walburn | A47B 88/42 312/334.27 |
| 2008/0210648 | A1 | * | 9/2008 | Davis | A47L 19/04 211/41.3 |
| 2012/0049713 | A1 | * | 3/2012 | Tingle | A47B 88/42 312/334.33 |
| 2012/0279935 | A1 | | 11/2012 | McNally | |
| 2013/0088134 | A1 | * | 4/2013 | Varner | A47B 88/44 312/348.1 |
| 2013/0200765 | A1 | * | 8/2013 | Foss | B63B 29/04 312/237 |
| 2014/0197121 | A1 | * | 7/2014 | Knight | A47B 88/407 211/86.01 |
| 2014/0306584 | A1 | * | 10/2014 | DeMars | A47F 9/00 312/140.2 |
| 2016/0278521 | A1 | * | 9/2016 | Chen | A47B 88/42 |
| 2017/0181542 | A1 | * | 6/2017 | Comeau | A47B 77/14 |
| 2017/0234340 | A1 | * | 8/2017 | Pensak | A41F 1/002 24/3.1 |
| 2019/0298059 | A1 | * | 10/2019 | Chen | A47B 77/18 |
| 2021/0022492 | A1 | * | 1/2021 | Tingle | A47B 88/42 |

FOREIGN PATENT DOCUMENTS

| | | | |
|---|---|---|---|
| WO | WO2006069566 | A1 | 7/2006 |
| WO | WO2015117731 | A1 | 8/2015 |
| WO | WO2016059573 | A1 | 4/2016 |

OTHER PUBLICATIONS

Designing for Knife Storage, Part 2: Beyond Knife Blocks and Wall Racks Core77, core77.com, Apr. 29, 2015.
8 inch 'No. Wiggle' Utensil Bin Base Cabinet Pullout. UBPO-8SC, Knobs.co, knobs.co, SKU: UBPO-8SC, Apr. 13, 2020.

* cited by examiner

SLIDABLE CABINET PULLOUT APPARATUS AND METHOD OF USE

FIELD OF THE INVENTION

The present disclosure relates to pullout cabinet drawers, in particular, vertical kitchen drawers for storing knives and kitchen utensils.

BACKGROUND OF THE INVENTION

Modern kitchens place premiums on cleanliness, aesthetic appeal and efficient use of space. Closed storage for easy access to cooking utensils, such as knives and cutting boards, promotes efficiency and kitchen cleanliness. But, in the prior art, knives are often stored in butcher blocks on the countertop. Butcher blocks detract from the aesthetic appeal of the kitchen and general cleanliness because they are difficult to clean. Similarly, the prior art provides no centralized method for storing cutting boards or miscellaneous utensils in a concealed and yet easy to clean fashion. Likewise, open air storage canisters for utensils detract from efficiency and aesthetic appearance. Hence, the prior art fails to provide a good kitchen storage solution for knives, cutting boards and miscellaneous utensils.

In an effort to overcome these difficulties, the prior art has responded by creating different types of storage systems. Yet, none of them is completely satisfactory.

For example, U.S. Pat. No. 7,802,688 to Ruan discloses a cutlery storage device with a plurality of separators. Cutlery is carried by a cutlery receiver. Magnets are provided for temporary storage of the cutlery. However, the device is designed to provide only open air storage on a countertop and limits storage to only knives of a certain length.

U.S. Pat. No. 7,306,301 to Walburn discloses a drawer slide system having a front wall, a back wall, a base, and a plurality of shelves. The base is mounted on a horizontally oriented drawer slide and a pair of vertically oriented drawer slides. But, the slides are all positioned at the base of the drawer and so provide limited vertical stability. Further, the system fails to provide a way to store miscellaneous utensils.

U.S. Pat. No. 10,251,480 to Chen discloses a pullout for installation in a preexisting cabinet. An adjustable face plate is provided. However, the face plate is difficult to adjust because of the complexity of the adjustment mechanism. The system also fails to provide a provision for storage of miscellaneous utensils.

For these reasons, there is a need for a highly stable pullout which provides a closed storage of various knives, cutting boards and miscellaneous kitchen utensils in a way that promotes kitchen cleanliness, efficiency and aesthetic appeal.

SUMMARY OF THE INVENTION

The current disclosure provides a pullout mechanism for closed secure storage of metallic and ceramic knives, cutting boards, miscellaneous utensils and kitchen appliances.

A storage subassembly provides a number of novel storage features. A fixed sealed magnetic bar is provided to securely suspend metallic knives. The magnetic bar includes a plurality of discrete magnets in an alternating polarity array to maximize the stability of the knives and minimize magnetization of the metallic knives. A removeable liner is positioned below the magnetic bar to aid in cleaning. Storage for ceramic knives is provided by a removable rubber casting having parallel, flexible, serpentine receiving slots, positioned in a fixed drawer surface adjacent the magnetic bar. A removeable liner is positioned below the casting for easy cleaning.

The storage subassembly further provides a plurality of removable canisters for closed storage of miscellaneous utensils positioned conveniently adjacent the magnetic bar.

The pullout mechanism also provides for slots for closed storage of cutting boards adjacent the canisters.

The storage subassembly further includes a bottom shelf for closed storage of supplies and appliances.

The pullout mechanism further includes a set of novel mounting brackets which provides for stable and yet adjustable mounting of a horizontally oriented top slide. A back bracket mounts the slide to the back wall of the cabinet carcass. A side bracket mounts the top slide to the side wall or face frame of the cabinet carcass. The horizontal oriented top slide greatly increases drawer stability when the pullout mechanism is deployed.

The pullout mechanism further includes a set of adjustable face plate mounting brackets for mounting and aligning the face plate with the surrounding cabinet faces.

The pullout mechanism also provides an adjustable base frame, with a pair of horizontally mounted slides, removably and adjustably attached to the storage subassembly.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals. The figures are not necessarily drawn to scale, and may be shown in exaggerated or generalized form in the interest of clarity and conciseness.

Figure 1A:
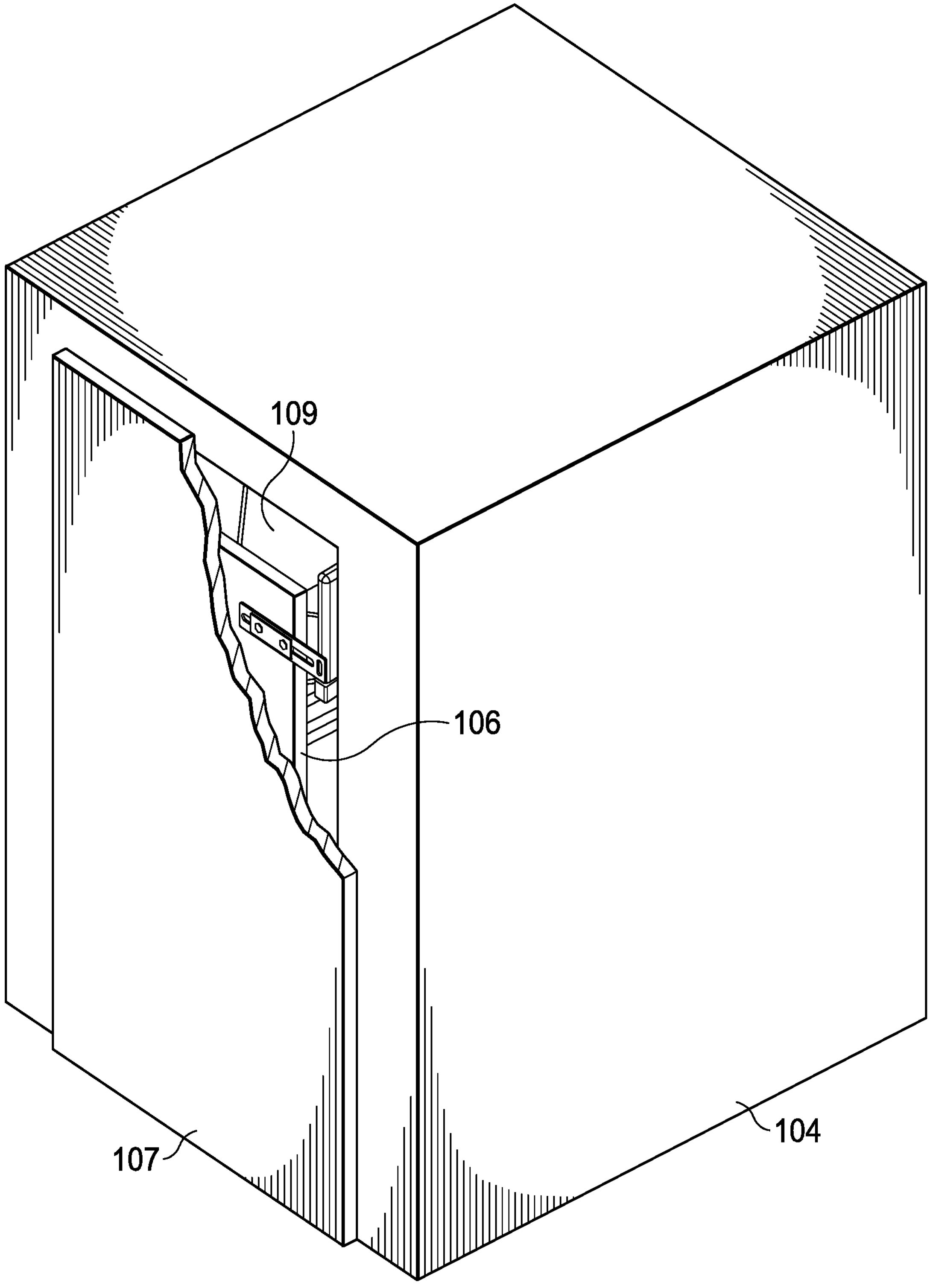
FIG. 1A is a partial isometric view of a kitchen pullout of a preferred embodiment in a stowed position.

Referring to FIG. 1A, kitchen pullout 106 is shown in stowed position centered in opening 109 of cabinet carcass 104.

Figure 1B:
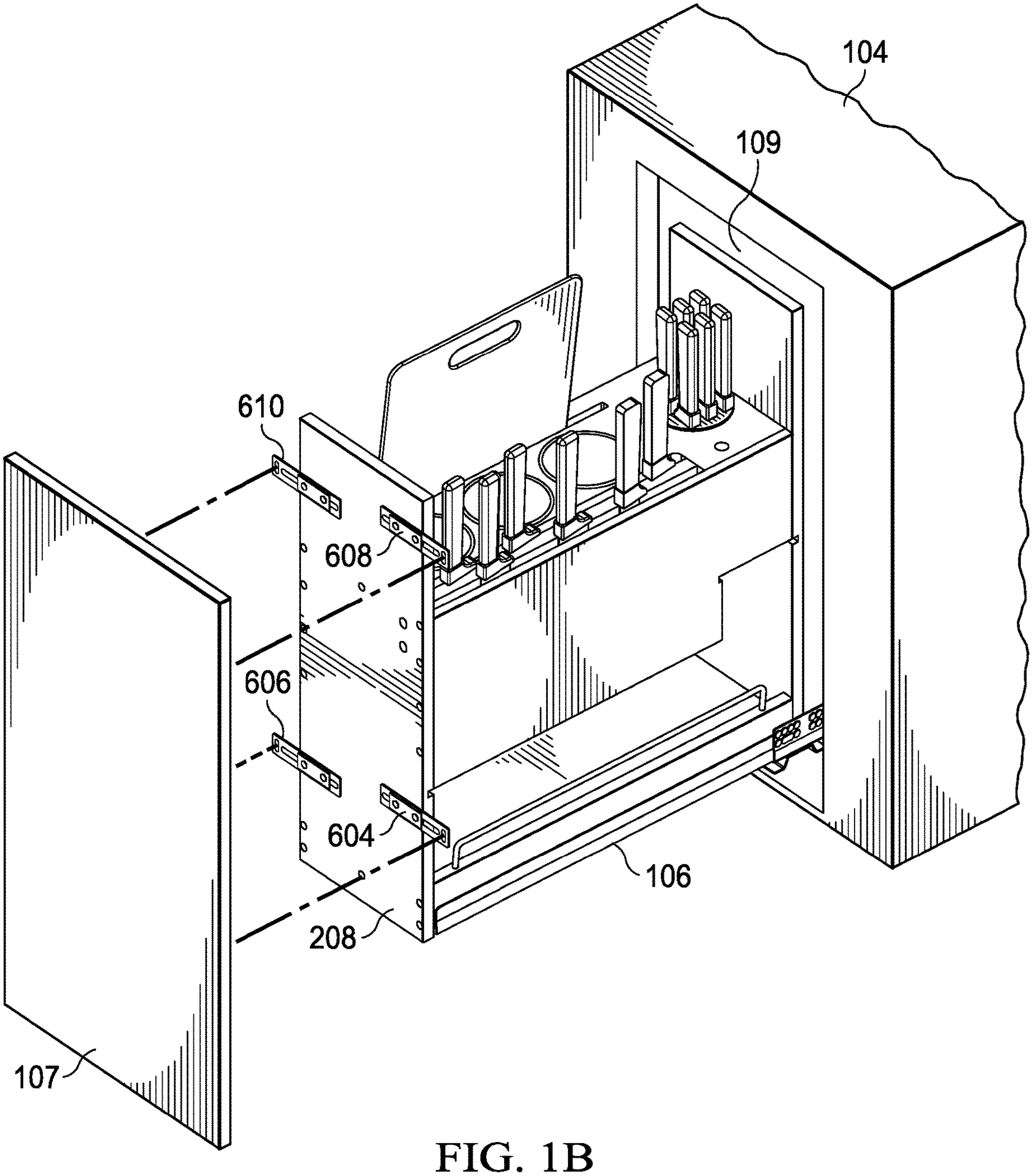
FIG. 1B is an exploded isometric view of a kitchen pullout of a preferred embodiment in a deployed position.

Referring to FIG. 1B, kitchen pullout 106 is shown in a deployed position. Kitchen pullout 106 includes front panel 208. Front panel 208 includes face plate mounting brackets 604, 606, 608 and 610. Face plate 107 is mounted to the face plate mounting brackets, as will be further described.

Figure 2A:
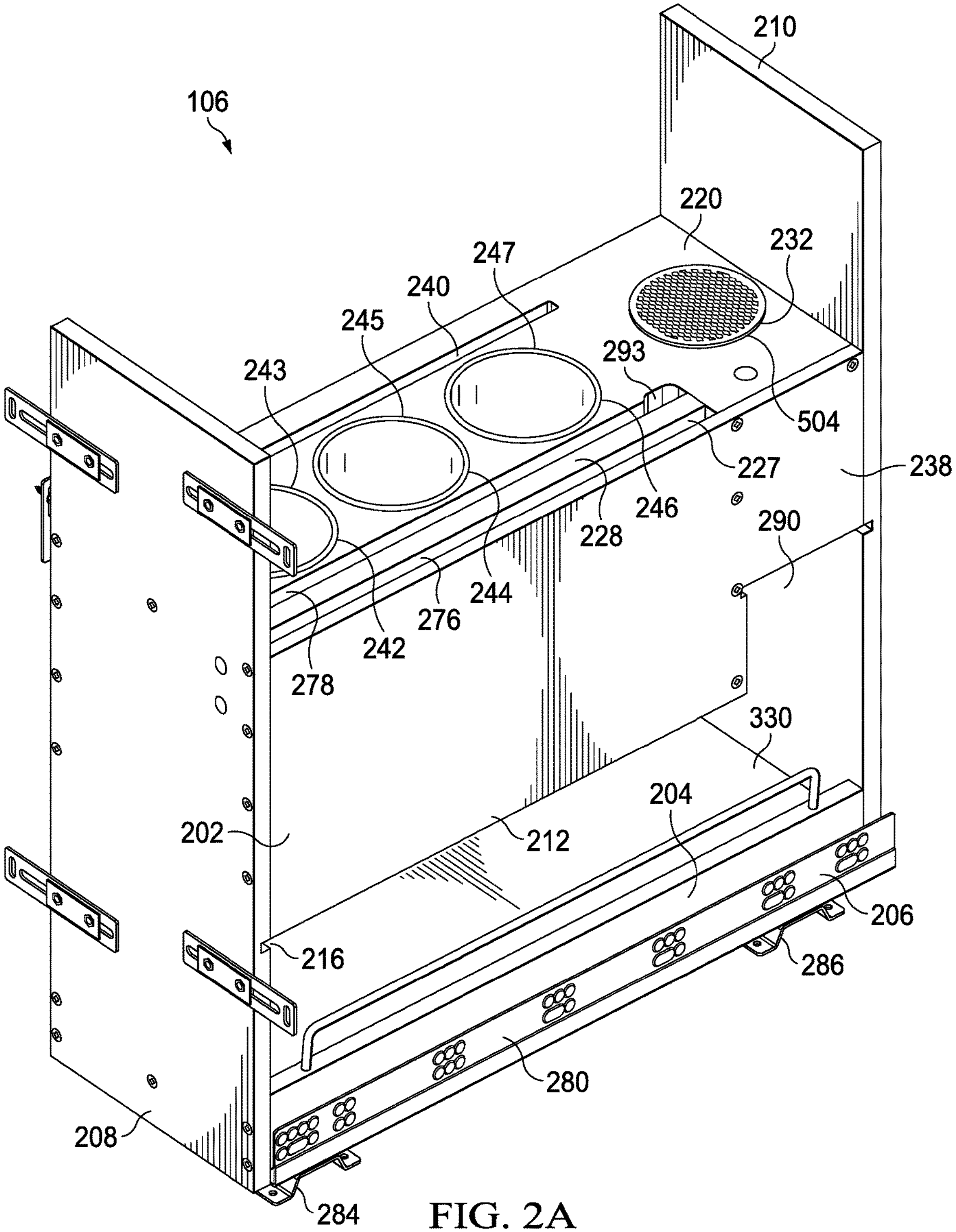
FIG. 2A is an isometric view of a kitchen pullout of a preferred embodiment.
Figure 2B:
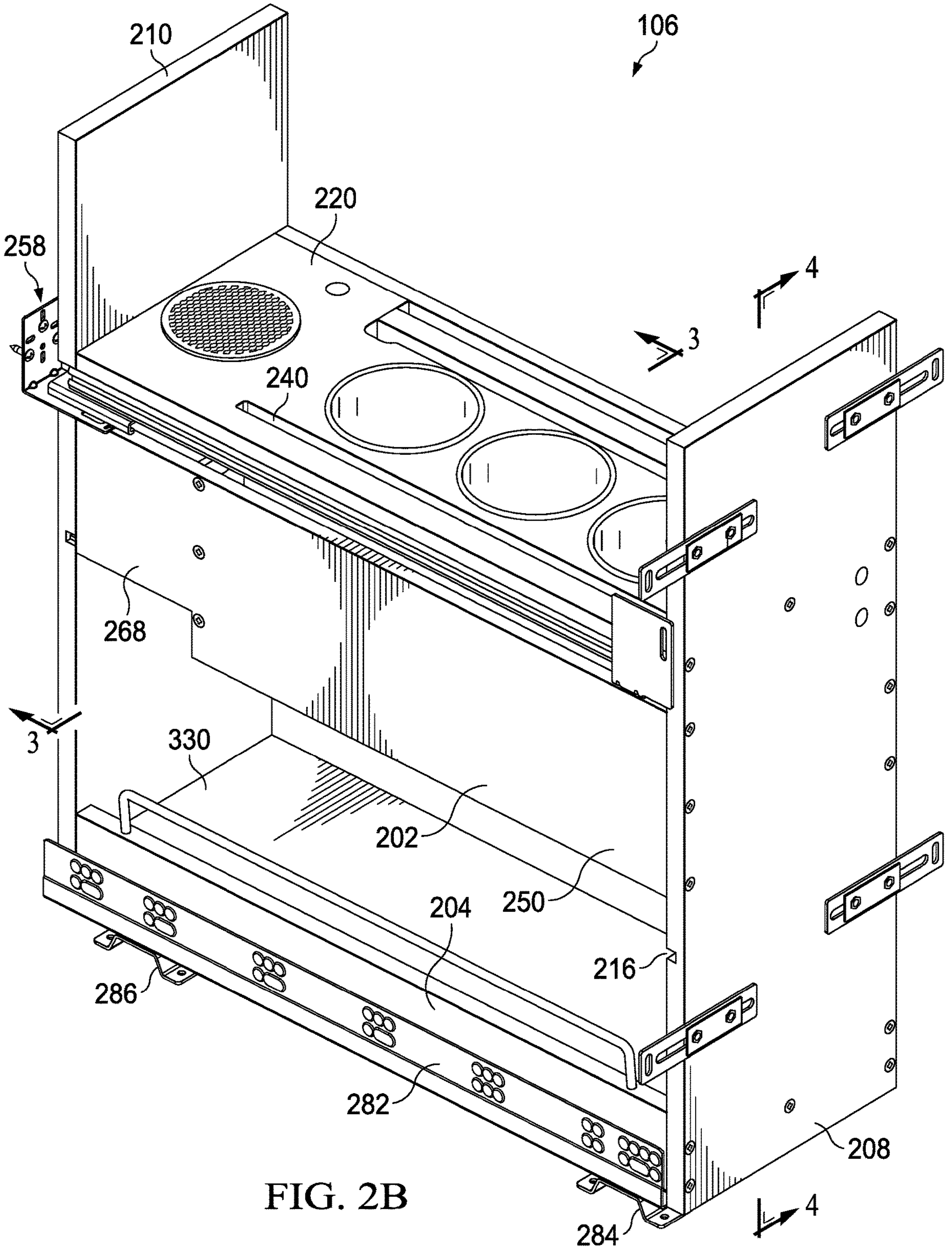
FIG. 2B is an isometric view of a kitchen pullout of a preferred embodiment.

Referring to FIGS. 2A and 2B, kitchen pullout 106 is comprised of front panel 208 and back panel 210. Front panel 208 and back panel 210 are generally rectangular and are generally parallel. Storage subassembly 202, bottom shelf subassembly 204 and bottom slide subassembly 206 are positioned between the front panel and the back panel.

Storage subassembly 202 includes side panel 212, side panel 250 and top shelf 220. Side panel 212 and side panel 250 are generally parallel and generally rectangular and are attached to front panel 208 and back panel 210 by a plurality of wood screws. A suitable industrial adhesive may also be used.

Side panel 212 includes raised rectangular extension 238 forming appliance bay 290. Appliance bay 290 is provided to accommodate large appliances positioned on the bottom shelf, as will be further described. In the preferred embodiment, the height of side panel 212 is between about 12 inches and about 16 inches. The length of the side panel is about 29 inches to about 39 inches. The height of extension 238 is between about 8 inches and about 10 inches. Of course, other dimensions may be used to accommodate different kitchen utensils and appliances.

Side panel 250 is generally rectangular raised rectangular extension 268. In a preferred embodiment, the height of side panel 250 is between about 7 inches and about 11 inches. The length of side panel 250 is between about 29 inches and about 39 inches. The height of extension 268 is between about 8 inches and about 10 inches. Of course, other dimensions may be used.

Top shelf 220 is supported by side panels 212 and 250 and is positioned between the front panel and the back panel. Top shelf 220 is generally rectangular and is generally parallel to bottom shelf 330, as will be further described. Top shelf 220 is attached to the side panels, the front panel and the back panel by a plurality of wood screws. A suitable industrial adhesive may also be used.

Top shelf 220 includes slot 240 located proximate top slide subassembly 258. Slot 240 is designed to accommodate flat kitchen appliances such as cutting boards. Top shelf 220 further includes holes 242, 244, and 246 designed to accommodate canisters 243, 245 and 247, respectively. Top shelf 220 further comprises hole 232. Rubber retainer 504 is positioned in hole 232. The rubber retainer is adapted to secure a plurality of ceramic knives, as will be further described. Top shelf 220 further includes a slot 227. Slot 227 is designed to accommodate magnetic bar 228. Magnetic bar 228 is positioned within slot 227, adjacent slots 276 and 278. Slots 276 and 278 are adapted to secure metallic knives of varying lengths against the magnetic bar, as will be further described. Slot 278 further comprises flair 293. Flair 293 is provided to accommodate a honing rod.

Figure 3:
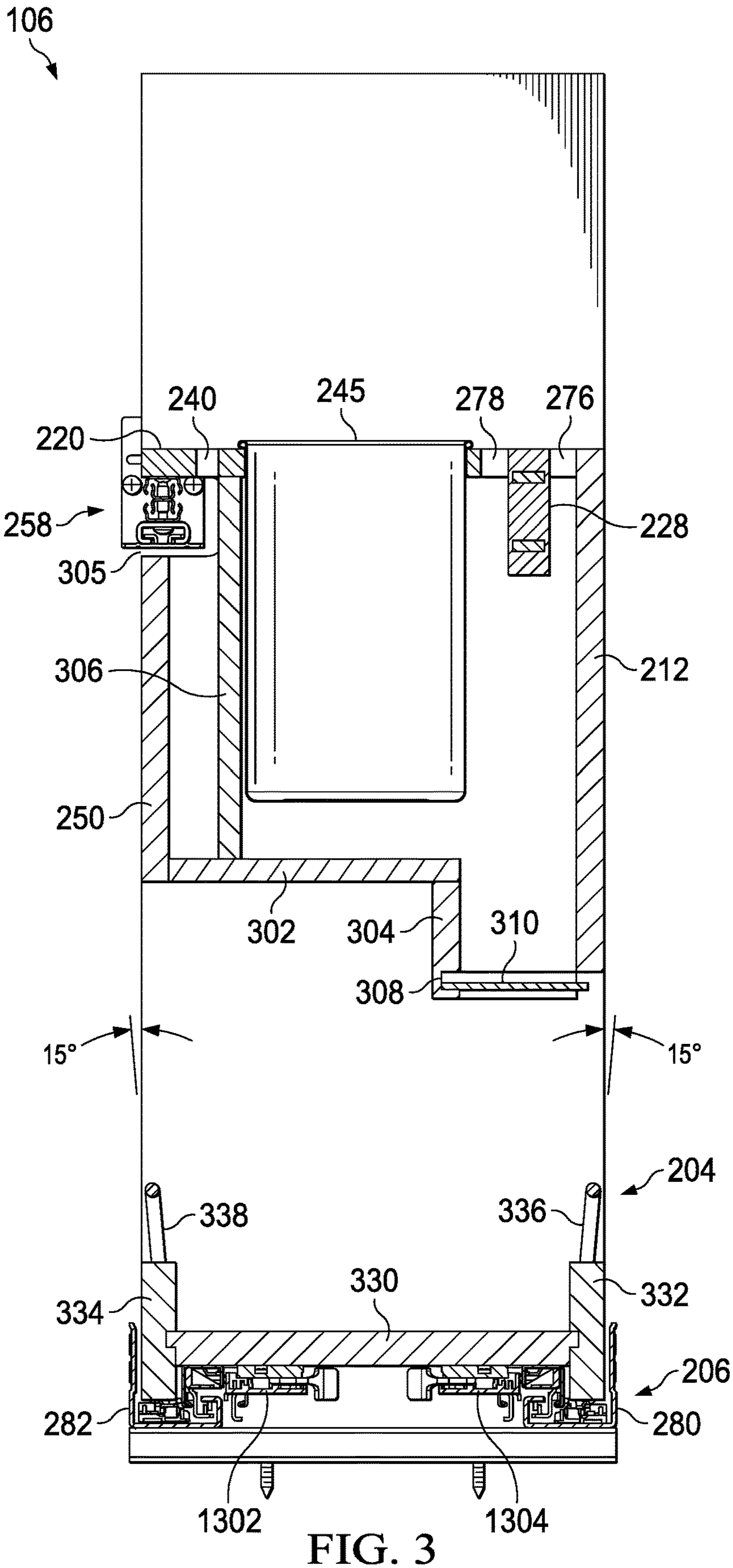
FIG. 3 is a cross-sectional view of a kitchen pullout of a preferred embodiment.

Referring also to FIG. 3, bottom panel 302 is rigidly attached to each of the front and back panels and side panel 250. Vertical support panel 306 is connected between the top shelf and the bottom panel and provides support for top shelf 220. Mounting bay 305 is formed adjacent top shelf 220 and above side panel 250, to accommodate top slide assembly 258, as will be further described.

Support riser 304 is attached to each of the front and back panels and bottom panel 302. Support riser 304 provides vertical support for bottom panel 302. Horizontal slot 308 is provided in support riser 304. Liner 310 fits within slot 308. Liner 310 is located below the magnetic bar. Liner 310 is removeable from slot 308 for cleaning. Liner 310 is preferably a Teflon® or polycarbonate sheet approximately ¼ inch in thickness.

Bottom shelf subassembly 204 extends between front panel 208 and back panel 210 below the storage subassembly. Bottom shelf subassembly 204 is attached to the front and back panels by a plurality of wood screws. Bottom shelf subassembly 204 includes bottom shelf 330. Bottom shelf 330 is attached to each of bottom shelf walls 332 and 334 by suitable screws or adhesive. Side rail 336 is attached to shelf wall 332. Side rail 338 is attached to shelf wall 334. In a preferred embodiment, each of the side rails is a polished drawn steel wire of about 5 mm in diameter. Preferably, the side rails are each attached at an angle of about 15° from vertical, oriented outwardly from the center of the mechanism. The outwardly facing mounting angles of the side rails are important to assist in access to appliances stored on the bottom shelf.

Bottom shelf subassembly 204 is supported by bottom slide subassembly 206. Bottom slide subassembly 206 includes telescoping drawer slides 280 and 282. The slides are operatively and removably attached to bottom shelf 330 by undermount slide connectors 1304 and 1302, as will be further described. Front base bracket 284 and rear base bracket 286 are transversely mounted to slides 280 and 282. The front base bracket and the rear base bracket attach the slides to the floor of the cabinet carcass and elevate the kitchen pullout to clear any face frame installed on the cabinet carcass.

Figure 4:
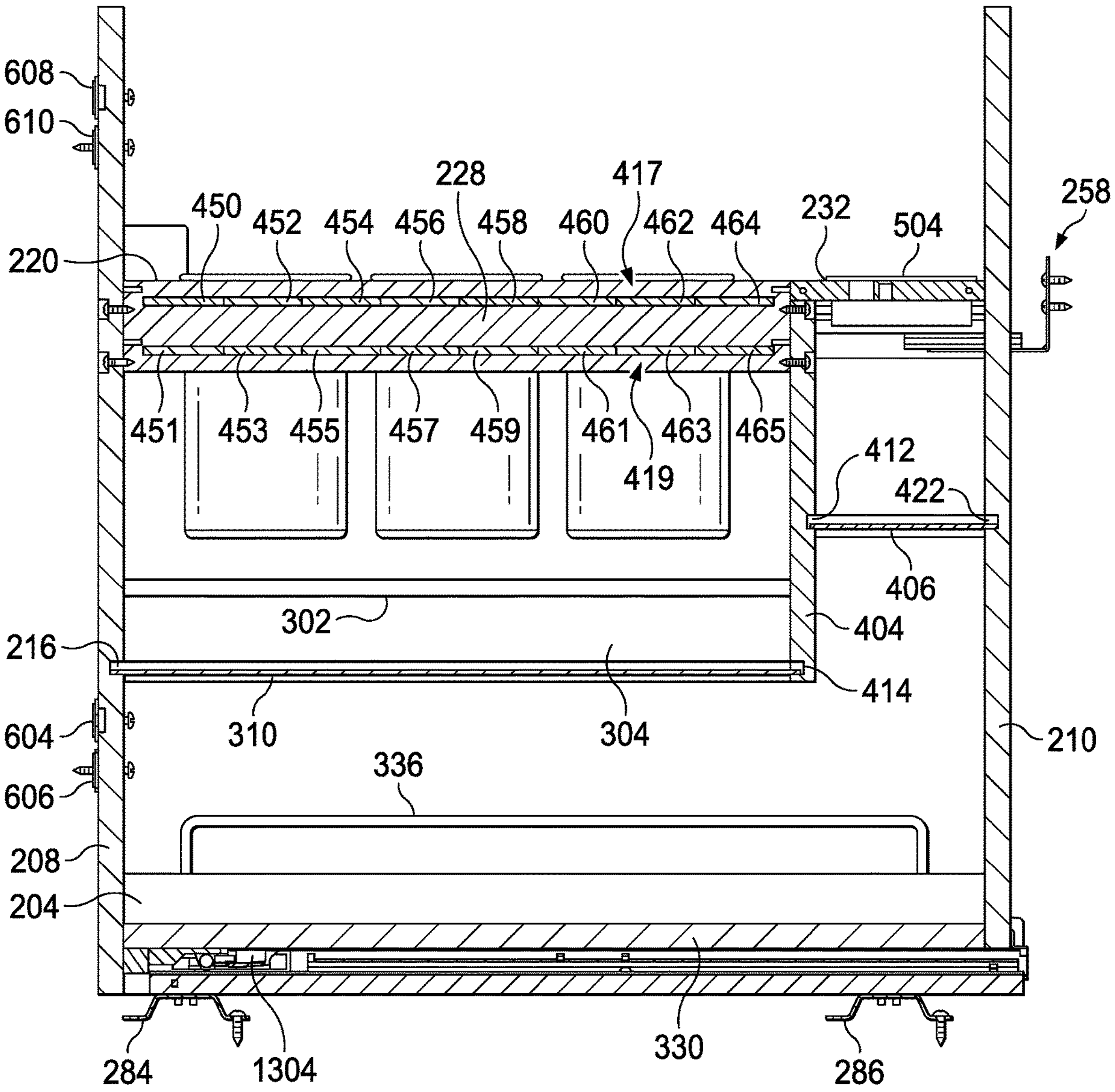
FIG. 4 is a cross-sectional view of a kitchen pullout of a preferred embodiment.

Referring also to FIG. 4, divider 404 is attached to top shelf 220 adjacent the magnetic bar and forms a vertical support for the magnetic bar and the top shelf. The divider extends across the width of the top shelf and is attached to the side panels. Divider 404 includes slot 414 which extends laterally along the width of the divider. Slot 414 is aligned with slot 216 on front panel 208. Slots 216 and 414 are aligned to accommodate liner 310 which is supported at either end by the slots and is removable for cleaning. Divider 404 further includes slot 412 which extends laterally opposite slot 422 on the back panel. Slots 412 and 422 accommodate liner 406 which is removably supported on either side by the slots for cleaning.

Magnetic bar 228 is attached between front panel 208 and divider 404 with screws or a suitable industrial adhesive. Magnetic bar 228 is preferably comprised of two longitudinal, generally parallel magnet rows 417 and 419. Magnet row 417 comprises magnets 450, 452, 454, 456, 458, 460, 462 and 464. Magnet row 419 comprises magnets 451, 453, 455, 457, 459, 461, 463 and 465. Each magnet row is positioned to be nearly adjacent the outwardly facing surfaces of the magnetic bar, as will be further described. In a preferred embodiment, the magnets are discrete, rectangular, high density neodymium magnets, arranged in an alternating polarity array, as will be further described.

Figure 5:
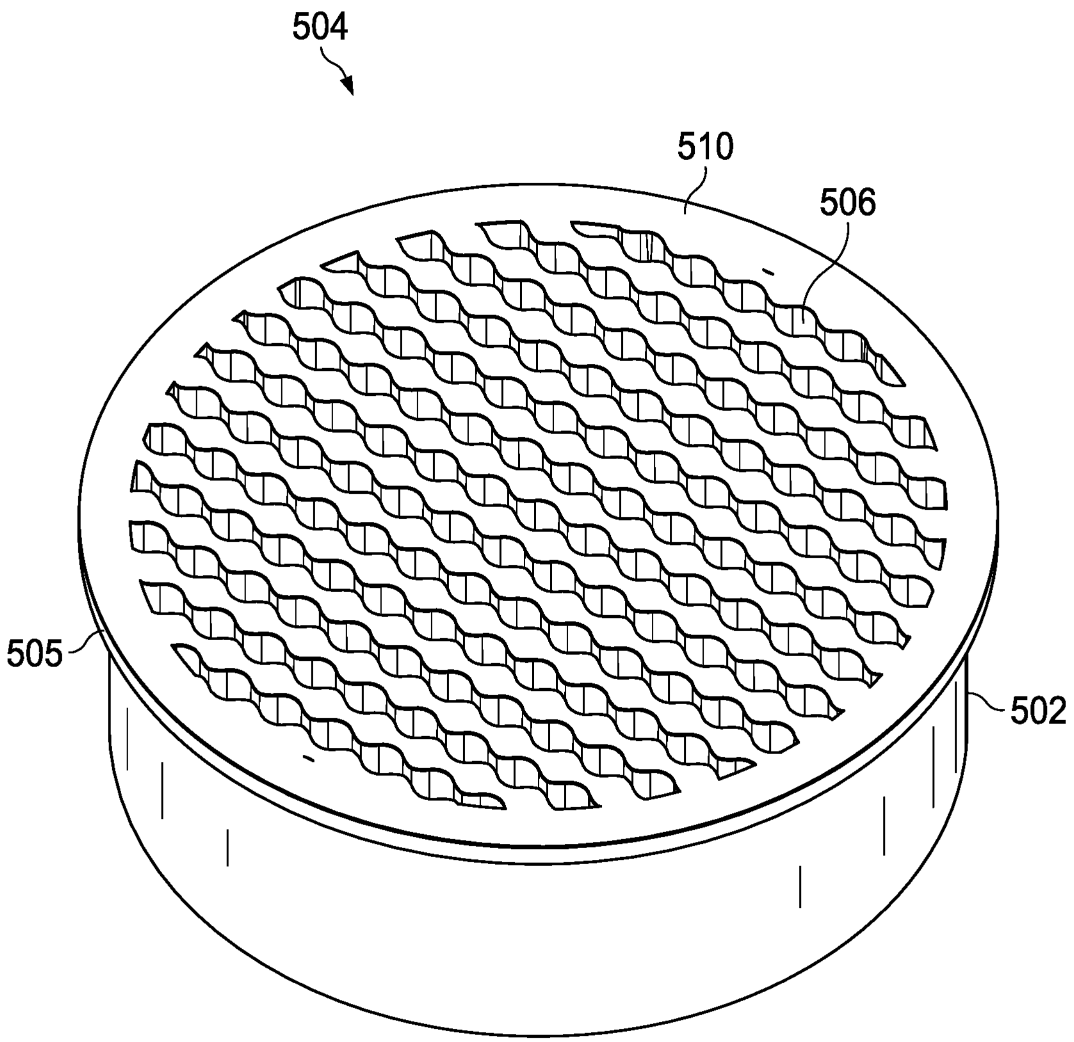
FIG. 5 is an isometric view of a ceramic knife retainer of a preferred embodiment.

Referring to FIG. 5, rubber retainer 504 is comprised of cylindrical side wall 502 and retainer surface 510. In a preferred embodiment, the side wall and retainer surface are integrally formed of a flexible rubber or neoprene casting. Rubber retainer 504 further comprises a plurality of generally parallel serpentine slots 506. The serpentine slots are, on average, about ⅛ inches wide. The serpentine slots allow for various placements of metallic knives and ceramic knives. Side wall 502 is positioned within hole 232. Flange 505 is positioned on the top shelf adjacent hole 232 and above liner 406. Rubber retainer 504 is removable from hole 232 so as to be washable.

Figure 6:
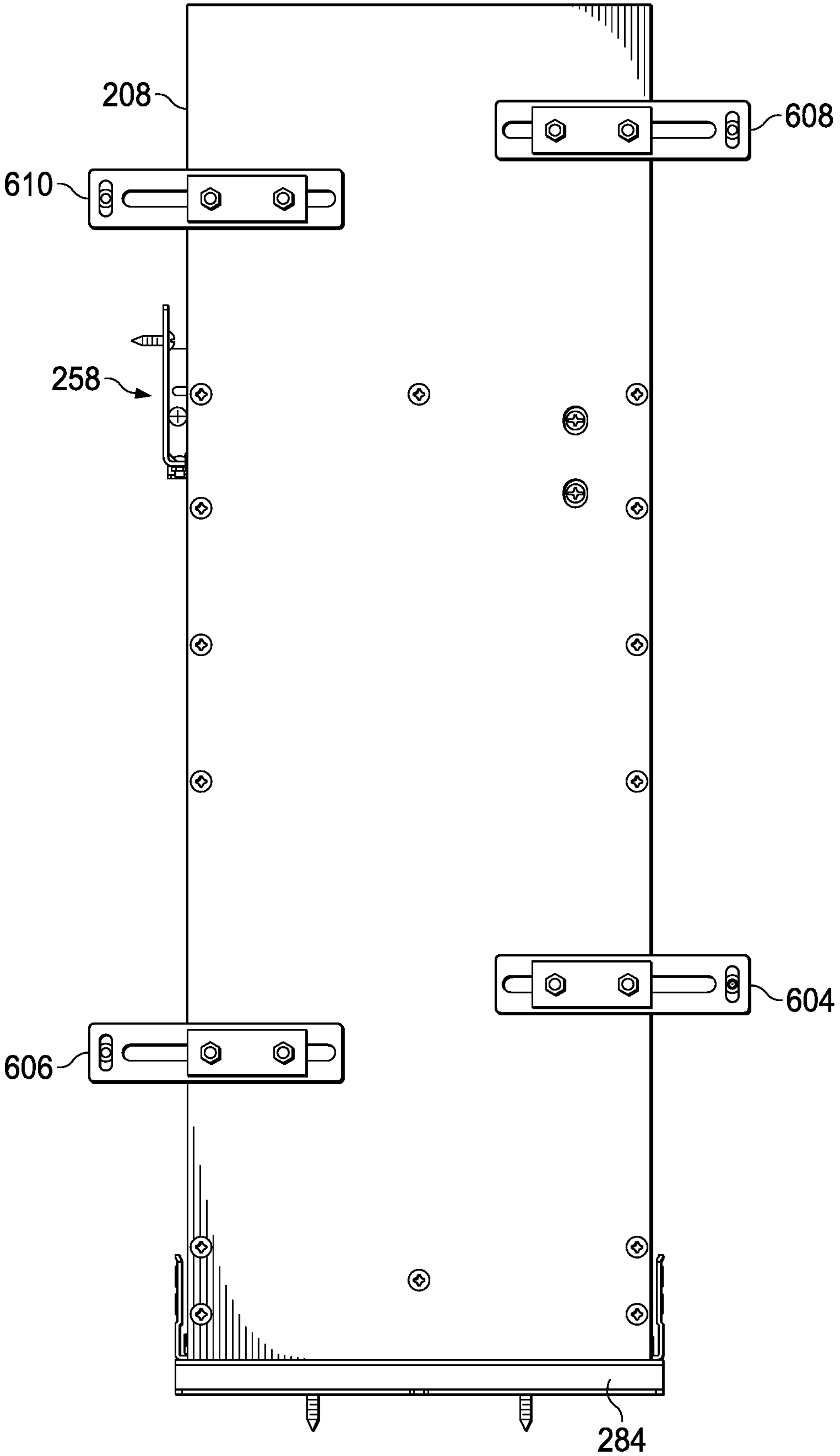
FIG. 6 is a front view of a kitchen pullout of a preferred embodiment.

Referring to FIG. 6, front panel 208 includes face plate mounting brackets 604, 606, 608, and 610. Face plate 107 is attached to the mount brackets by wood screws or a suitable industrial adhesive. The face plate mounting brackets are adapted to allow lateral adjustment face plate 107 so as to align it with the cabinet carcass. Details of the face plate mounting brackets and their adjustment are described in U.S. Pat. No. 10,251,480 to Chen, which is incorporated herein by reference in its entirety.

Figure 7:
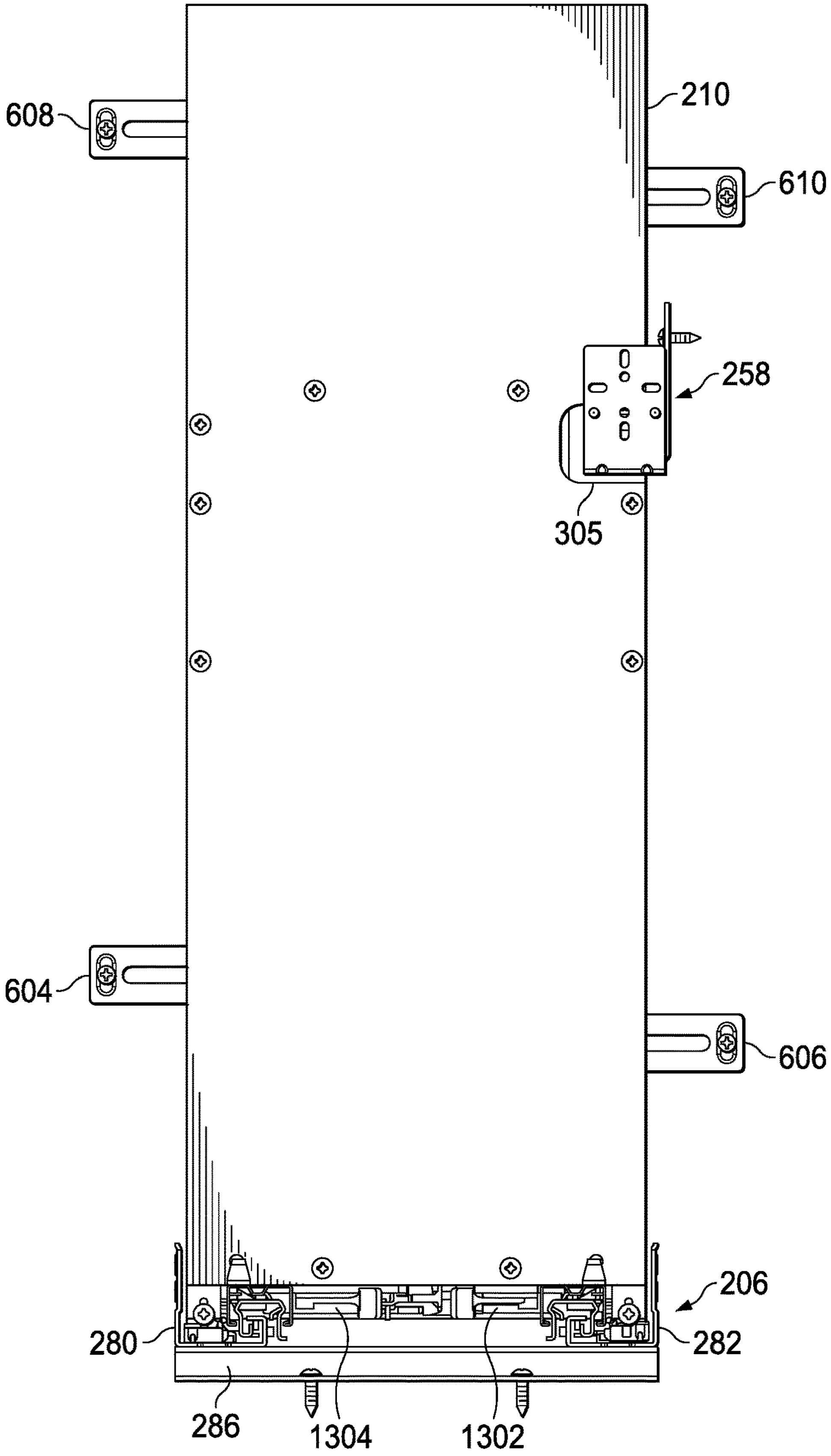
FIG. 7 is a back view of a kitchen pullout of a preferred embodiment.

Referring to FIG. 7, back panel 210 is generally rectangular. The back panel is attached to the top shelf, the bottom shelf and the side panel by a plurality of screws. Alternatively, an industrial adhesive may suffice. Back panel 210 further comprises mounting bay 305. Mounting bay 305 is a substantially square longitudinal recess formed in the back panel that accommodates the top slide subassembly, as will be further described. Bottom slide subassembly 206 is attached at the base of the bottom panel, as previously described.

Referring to FIGS. 8A, 8B, 8C and 8D, top slide assembly 258 includes top drawer slide 803. Top drawer slide 803 is further comprised of upper rail 802 and lower rail 804. Upper rail 802 is engaged with lower rail 804 by a plurality of linear bearings (not shown) which allow upper rail 802 to slide with respect to lower rail 804 in a telescoping movement as the pullout is extended or retracted. Upper rail 802 is secured to the underside of the top shelf, in a horizontal orientation, that is, with the top rail above the lower rail, by screws (not shown) through holes 806, 808, 810 and 812. The horizontal orientation of the upper rail is important because it increases stability of the pullout, relative to the cabinet carcass when the pullout is in the extended position.

Lower rail 804 is adjustably attached to front bracket 820 by retainer bracket 818. Bracket 820 includes horizontal flange 842 and upward vertical flange 836. The horizontal flange and vertical flange are substantially perpendicular. Horizontal flange 842 includes horizontal slot 838. Vertical flange 836 includes vertical slot 840.

Retainer bracket 818 includes flange 850 and flange 852 which are located on either side of web 854. Flange 850 includes threaded hole 828 and retainer tab 856. Retainer tab 856 extends from flange 850 substantially parallel over web 854. Flange 852 includes right angle slot 834. Web 854 includes threaded hole 832.

Figure 8A:
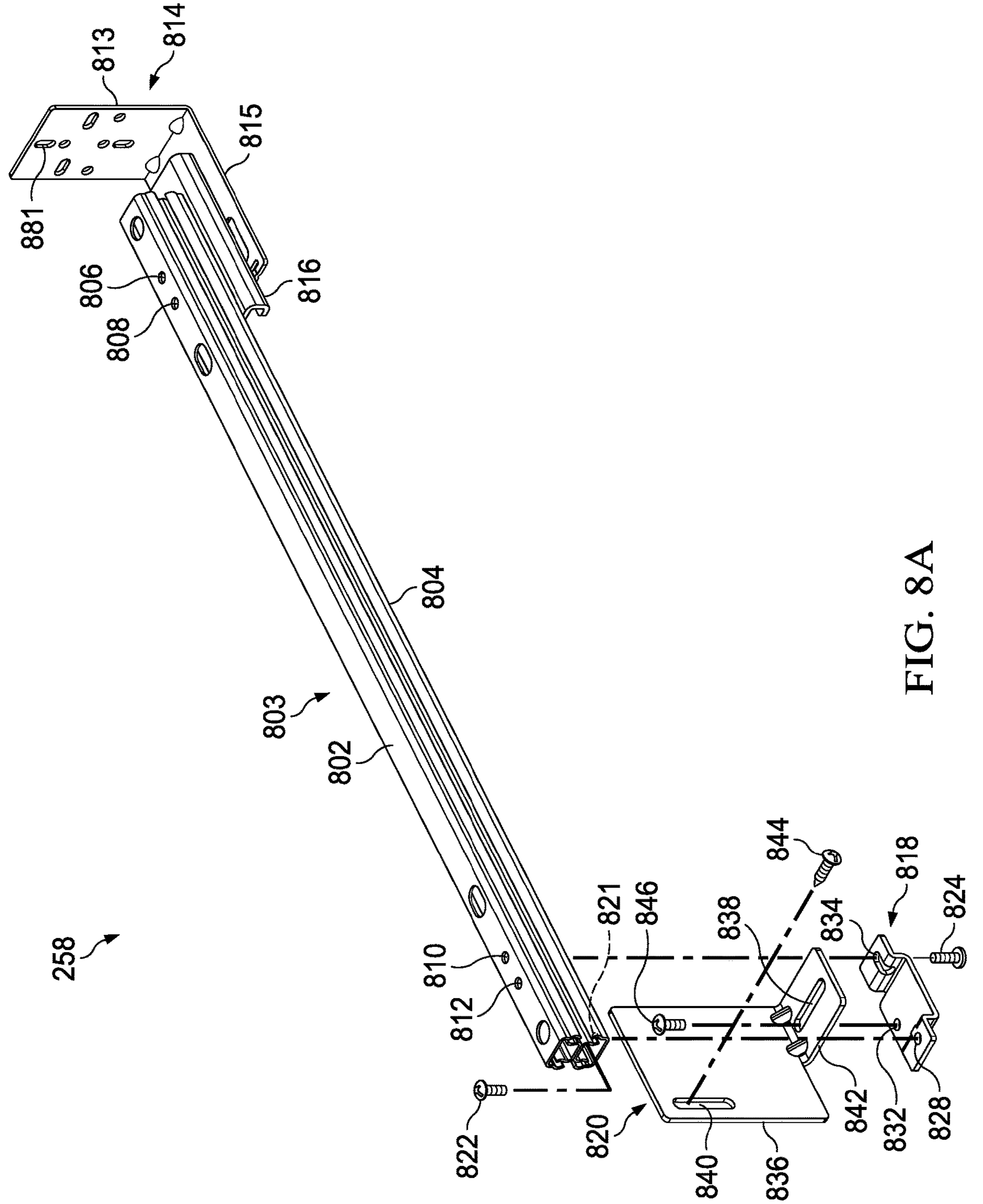
FIG. 8A is an exploded isometric view of a top slide assembly of a preferred embodiment.
Figure 8B:
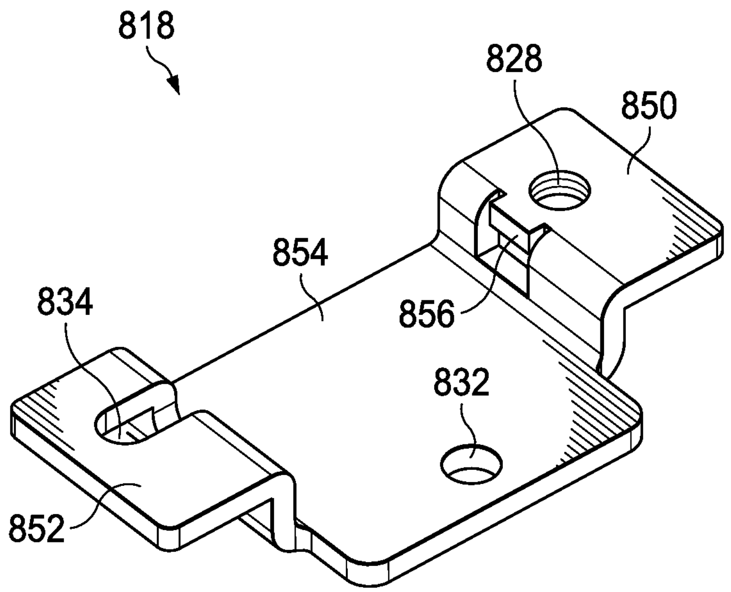
FIG. 8B is an isometric view of a bracket of a preferred embodiment.
Figure 8C:
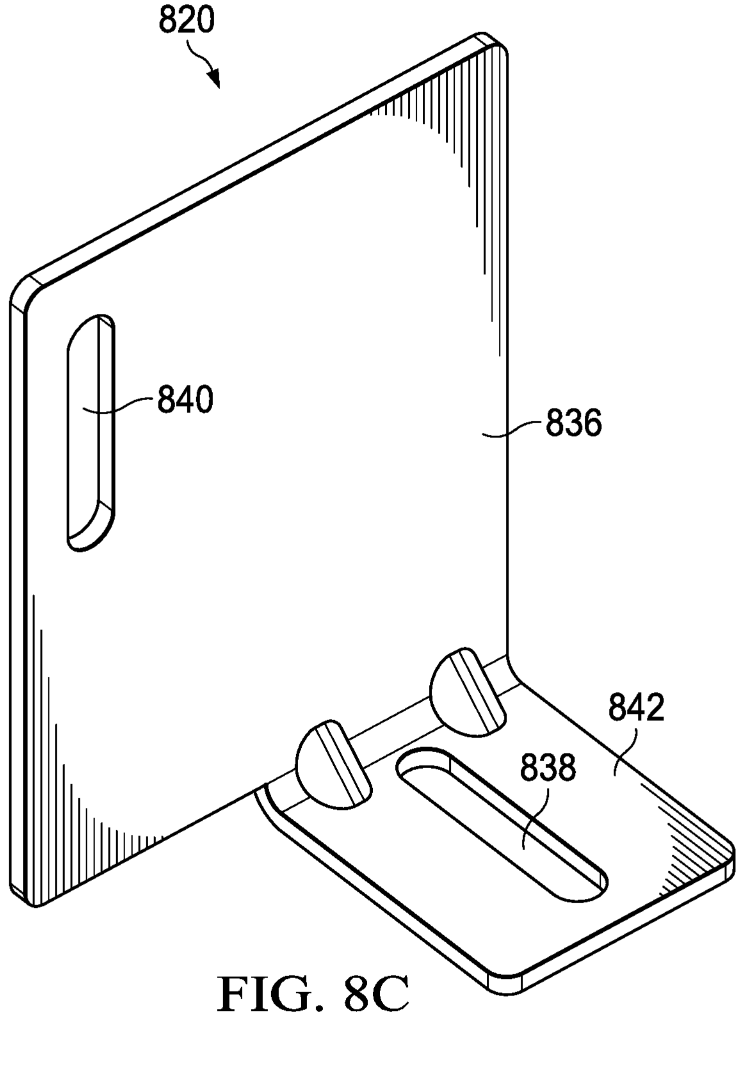
FIG. 8C is an isometric view of a side mount bracket of a preferred embodiment.
Figure 8D:
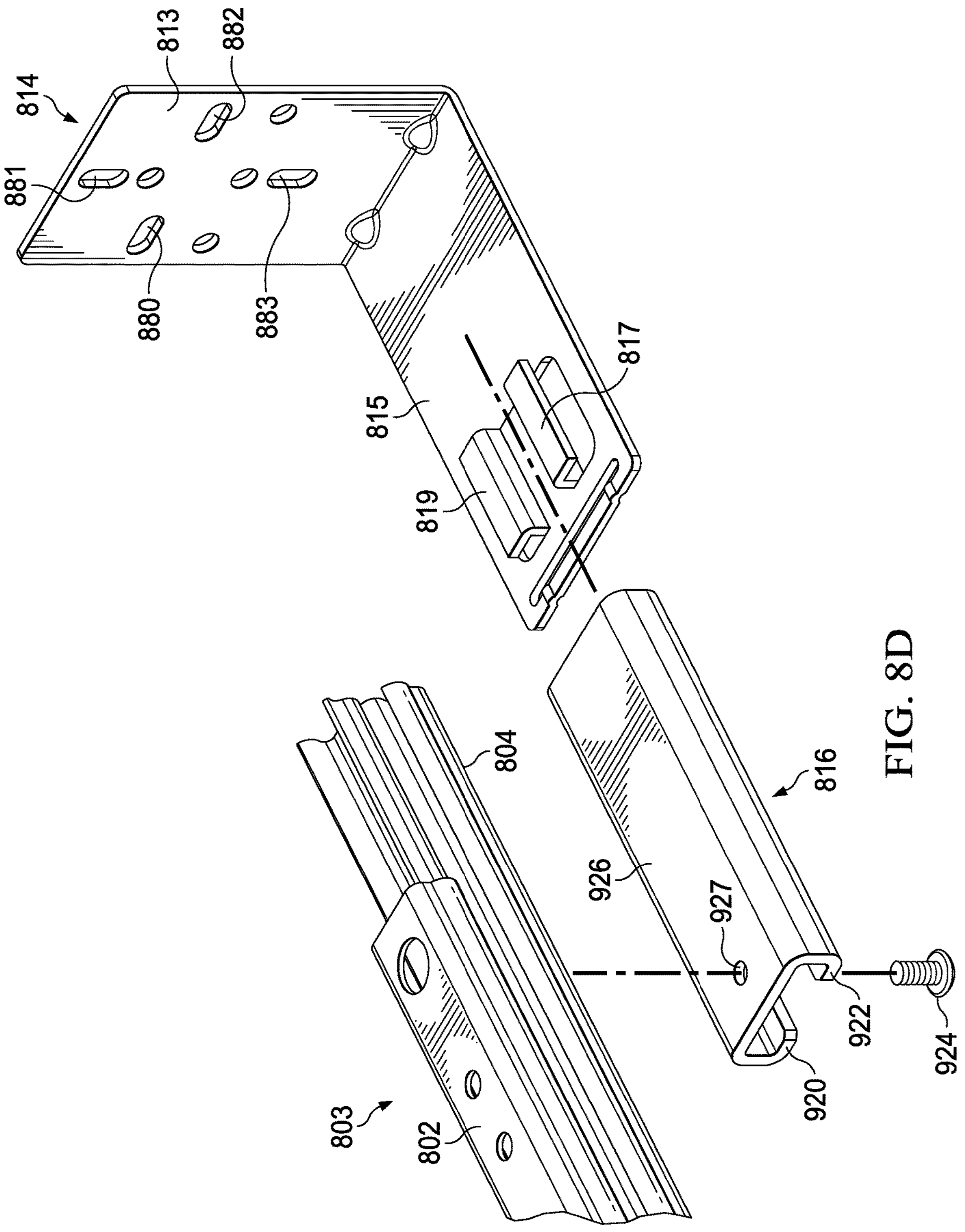
FIG. 8D is an exploded isometric view of a bracket and a top slide of a preferred embodiment.

Referring to FIG. 8D, lower rail 804 is also attached to rear bracket 814. Rear bracket 814 includes vertical flange 813 and horizontal flange 815. Vertical flange 813 is substantially perpendicular to horizontal flange 815. Vertical flange 813 includes holes 880, 881, 882 and 883, for attachment of rear bracket 814 to the cabinet carcass with screws (not shown). Holes 880 and 882 provide lateral adjustment of rear bracket 814. Holes 881 and 883 provide vertical adjustment of rear bracket 814. Horizontal flange 815 includes integral flanges 817 and 819. The integral flanges are parallel to the longitudinal axis of the horizontal flange and are diametrically opposed.

Slide connector 816 incorporates linear flanges 922 and 920. The linear flanges are integrally formed with web 926. Web 926 includes hole 927. Flange 922 is designed to slidingly engage flange 817. Flange 920 is designed to slidingly engage flange 819. Screw 924 is adapted to pass through hole 927 and into lower rail 804, thereby adjustingly securing it to the slide connector. In use, the slide connector is allowed to float on flanges 817 and 819 so as to allow depth adjustment of the lower rail with respect to the cabinet carcass.

In use, retainer bracket 818 is attached to the lower rail by screw 822 and screw 824. Screw 822 is inserted hole 821 on the lower rail and threaded into threaded hole 828. Screw 824 is inserted through right angle slot 834 and into a threaded hole on the lower slide (not shown). Horizontal flange 842 is adjustably fitted between flange 850 and flange 852 and between web 854 and retainer tab 856. Screw 846 is inserted through slot 838 and threaded in threaded hole 832. Front bracket 820 can move laterally within the retainer bracket to adjust the horizontal distance between top drawer slide 803 and the cabinet carcass. Screw 844 is inserted through slot 840 and attached to the cabinet carcass thereby securing upward vertical flange 836 to the cabinet carcass. Slot 840 allows vertical adjustment of the lower rail. Screw 846 is tightened to secure the position of the lower rail with respect to the cabinet carcass.

Figure 9:
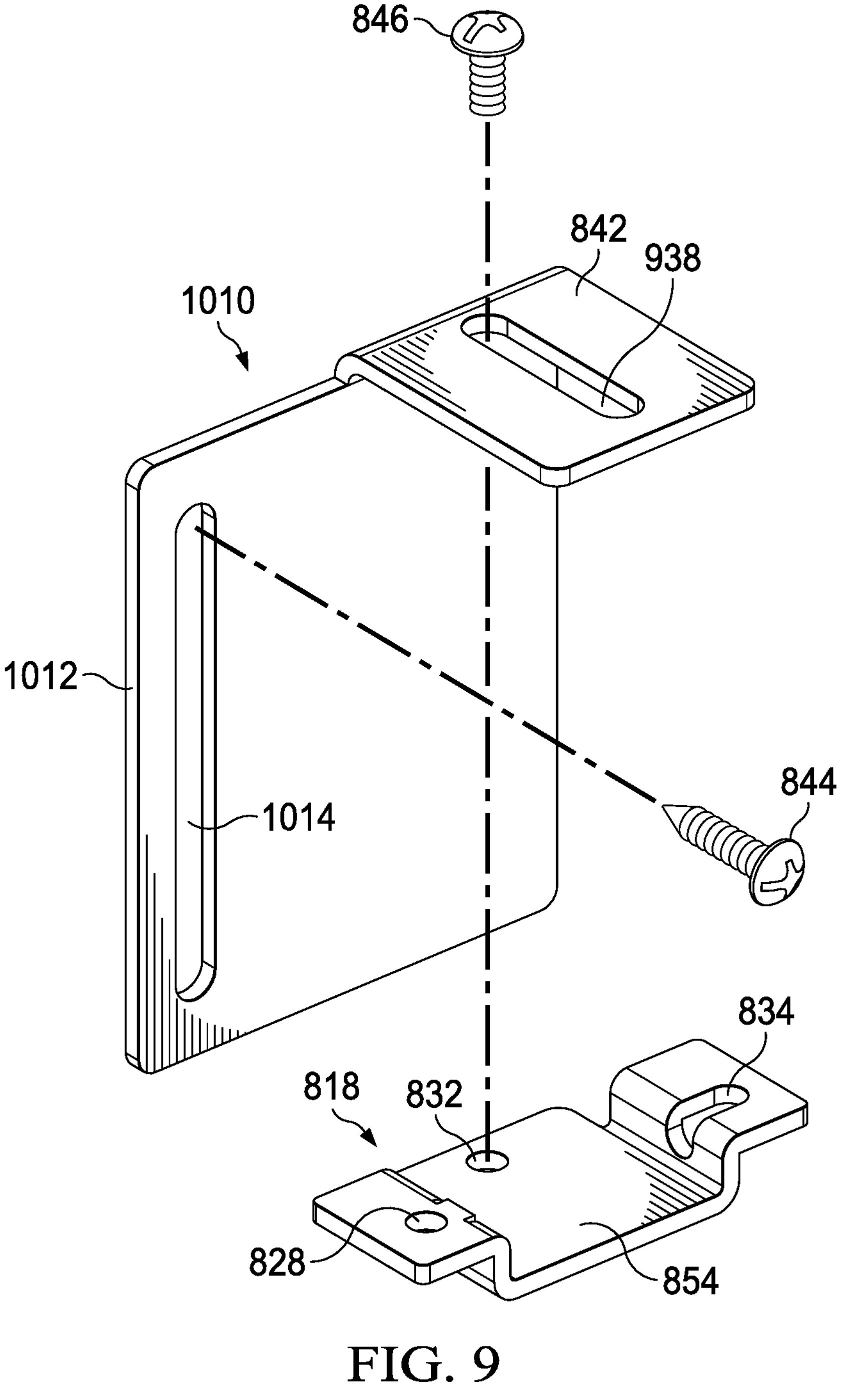
FIG. 9 is a partial exploded isometric view of a top slide bracket assembly of a preferred embodiment.

Referring to FIG. 9, an alternate embodiment of front bracket 820 will be described. Front bracket 1010 includes horizontal flange 842 and downward vertical flange 1012. Downward vertical flange 1012 extends downward substantially perpendicularly to horizontal flange 842. Horizontal flange 842 includes horizontal slot 938. Downward vertical flange 1012 includes vertical slot 1014. Screw 844, through slot 1014, adjustably secures front bracket 1010 to the cabinet carcass and provides vertical adjustment for the top rail relative to the cabinet carcass. Screw 846, through slot 938, adjustably secures front bracket 1010 to retainer bracket 818 and provides lateral adjustment for the top rail relative to the cabinet carcass. Lower rail 804 is secured to retainer bracket 818, as previously described.

Figure 10A:
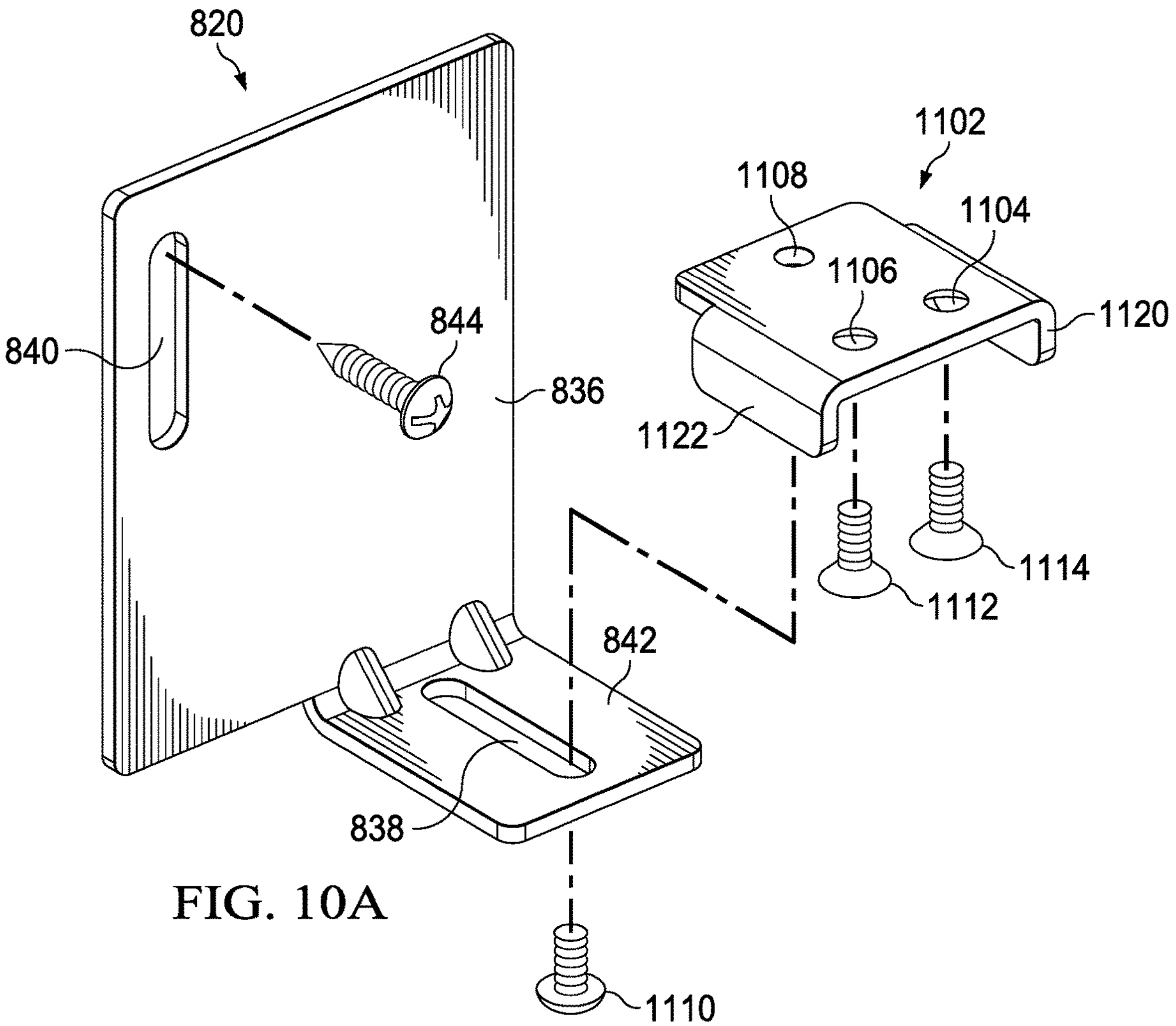
FIG. 10A is a partial exploded isometric view of a top slide bracket assembly of a preferred embodiment.
Figure 10B:
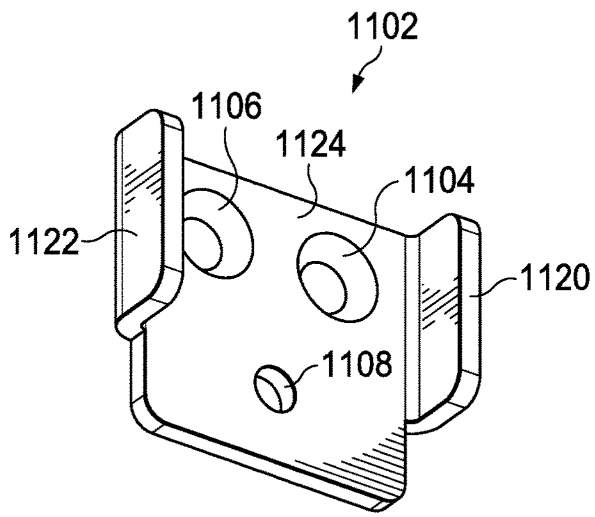
FIG. 10B is an isometric view of a retainer bracket of a preferred embodiment.

Referring to FIGS. 10A and 10B, an alternate embodiment of retainer bracket 818 will be described. Retainer bracket 1102 includes web 1124. Web 1124 includes hole countersink 1106, hole countersink 1104, and threaded hole 1108. Flanges 1120 and 1122 extend downward and substantially perpendicularly from web 1124.

Horizontal flange 842 fits between flanges 1120 and 1122. Flanges 1120 and 1122 act as a guide for horizontal adjustment of the top rail provided by horizontal flange 842. Screw

1111 is inserted through slot 838 and attached to threaded hole 1108. Screw 1111 is tightened to secure the horizontal position of horizontal flange 842. Screw 844 is tightened to secure the vertical position of bracket 820.

In use, retainer bracket 1102 is attached to the bottom of the lower rail by countersink screws 1112 and 1114. The low clearance height provided by the countersink screws is important to allow the horizontal flange to slide within the flanges to laterally adjust the lower rail.

Figure 11:
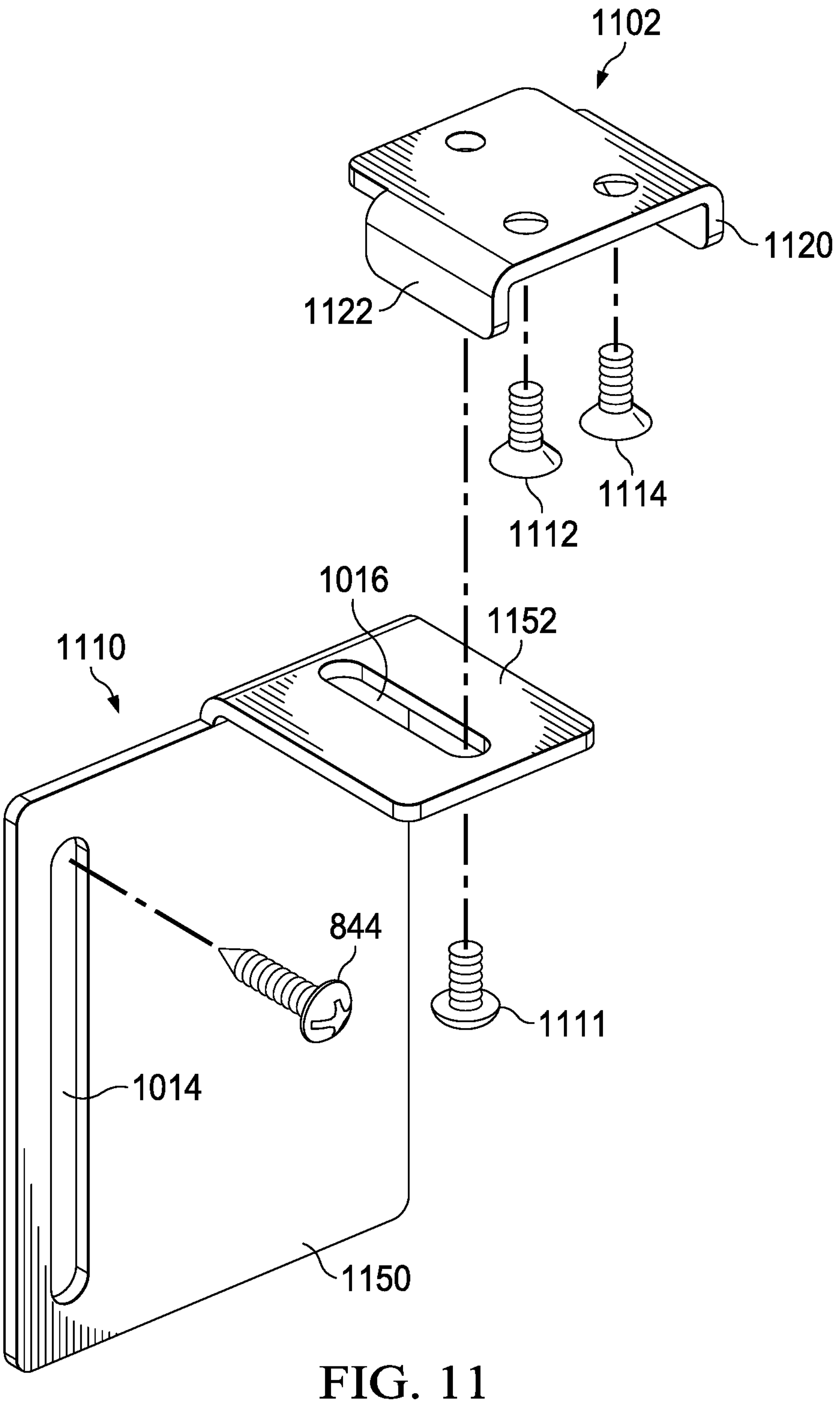
FIG. 11 is an exploded isometric view of a top slide bracket assembly of a preferred embodiment.

Referring to FIG. 11, an alternate embodiment of front bracket 820 will be described. Front bracket 1110 includes downward vertical flange 1150 integrally formed with horizontal flange 1152. Downward vertical flange 1150 includes vertical slot 1014. Horizontal flange 1152 includes horizontal slot 1016. Bracket 1110 is positioned in retainer bracket 1102 guided by flanges 1120 and 1122. Screw 1111 is tightened to secure the horizontal position of the top slide with respect to front bracket 1010. Screw 844 is inserted through vertical slot 1014 into the cabinet carcass and secured to adjust the vertical position of the top slide relative to front bracket 1110.

Figure 12A:
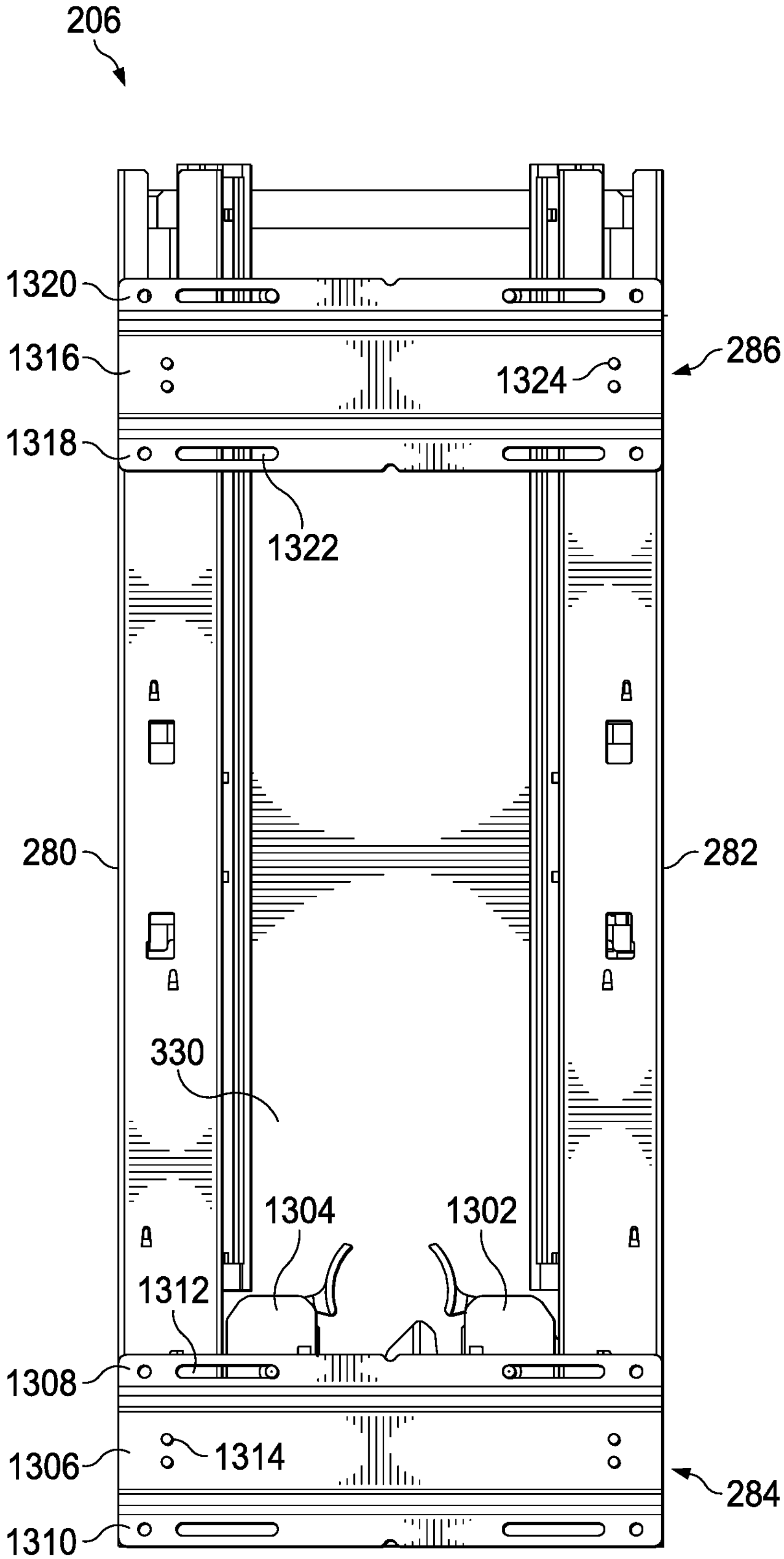
FIG. 12A is a bottom view of a kitchen pullout of a preferred embodiment.
Figure 12B:
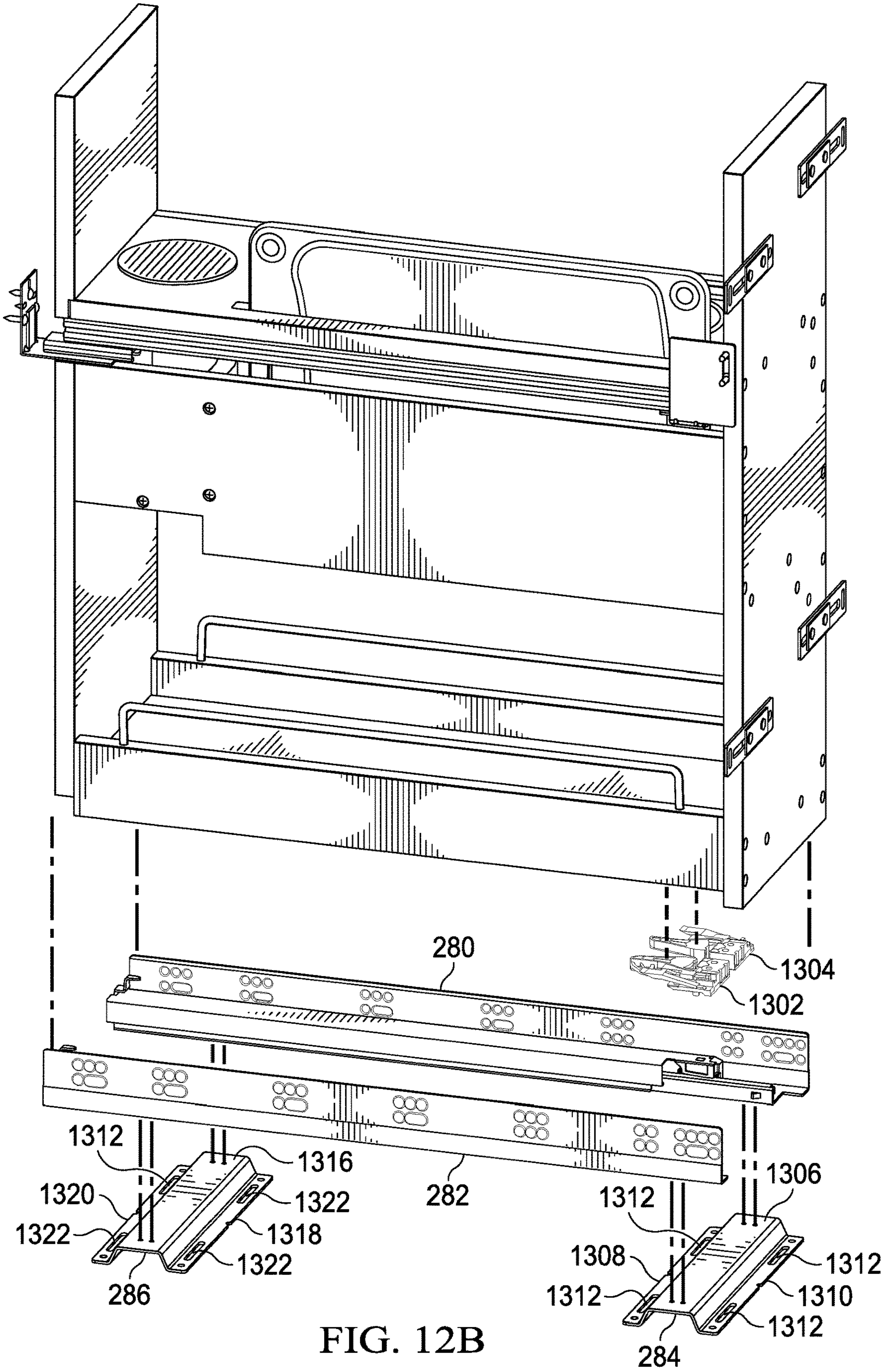
FIG. 12B is an exploded view of a kitchen pullout of a preferred embodiment.

Referring to FIGS. 12A and 12B, bottom slide subassembly 2010 will be further described. Bottom slide subassembly 206 includes parallel telescoping horizontally oriented undermount drawer slides 280 and 282. Drawer slides 280 and 282 are removably and adjustably connected to bottom shelf 330 by undermount slide connectors 1302 and 1304. Details of the undermount slide connectors are disclosed in U.S. Pat. No. 9,782,001 to McGregor, which is incorporated herein by reference in its entirety.

The bottom slide subassembly further includes front base bracket 284 and rear base bracket 286. The front base bracket includes web 1306. Flanges 1308 and 1310 are integrally formed with web 1306. Flange 1308 includes a plurality of lateral slots 1312. Rivets 1314 connect the front base bracket generally perpendicularly to the slides. The rear base bracket includes web 1316. Flanges 1318 and 1320 are integrally formed with web 1316. Flange 1318 includes plurality of lateral slots 1322. Rivets 1324 connect the rear base bracket generally perpendicularly to the slides.

In use, the front base bracket and the rear base bracket, including drawer slides 280 and 282, are attached to the floor of the cabinet carcass by screws inserted through plurality of slots 1312 and 1322 in the base brackets The slots provide a horizontal adjustment for the pullout relative to the cabinet carcass. Vertical, lateral and depth adjustments are provided by the undermount slide connections.

Figure 13A:
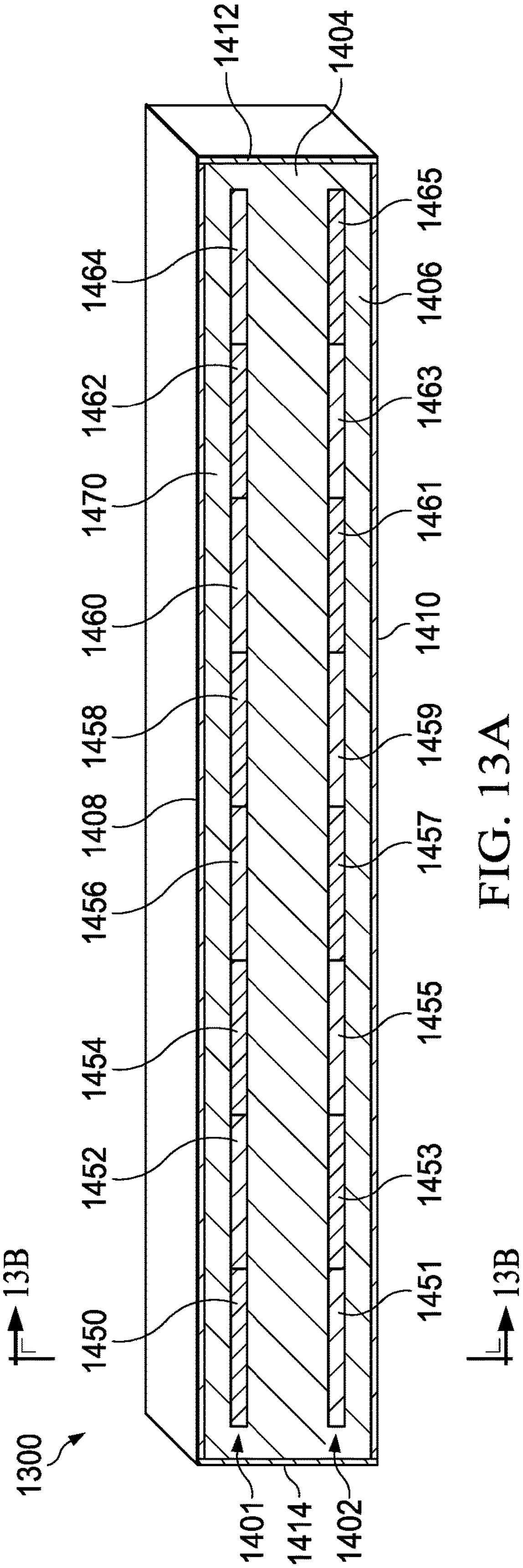
FIG. 13A is a cross-sectional view of a magnetic bar of a preferred embodiment.
Figure 13B:
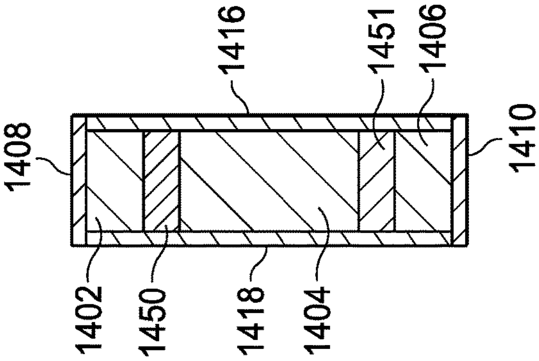
FIG. 13B is a cross-sectional view of a magnetic bar of a preferred embodiment.

Referring to FIGS. 13A and 13B, a preferred embodiment of the magnetic bar will be further described.

Magnetic bar is a sealed composite laminate comprised of top laminate 1408, top bar section 1470, magnet row 1401, mid-bar section 1404, magnet row 1402, bottom bar section 1406 and bottom laminate 1410. The magnetic bar is bounded at either end by laminate 1414 and by laminate 1412. The magnetic bar is bounded at either side by laminate 1418 and 1416, respectively. Each layer of the composite laminate bar is bonded by a suitable industrial adhesive, preferably a water proof epoxy resin.

Magnet row 1401 is comprised of discrete rectangular magnets 1450, 1452, 1454, 1456, 1458, 1460, 1462 and 1464. Magnet row 1402 is comprised of discrete rectangular magnets 1451, 1453, 1455, 1457, 1459, 1461, 1463 and 1465. The magnets are arranged in an alternating polarity array that biases the resulting magnetic field toward the outward facing surfaces of the magnetic bar, as will be further described.

The laminates and sections in a preferred embodiment, are made of finished hardwood. In an alternate embodiment, top bar section 1470, mid-bar section 1404 and bottom bar section 1406 are made of marine plywood, Delrin® or Teflon®. In an alternate embodiment, top laminate 1408, bottom laminate 1410, side laminate 1418 and side laminate 1416 are made of Delrin® or Teflon® sheeting.

Figure 14:
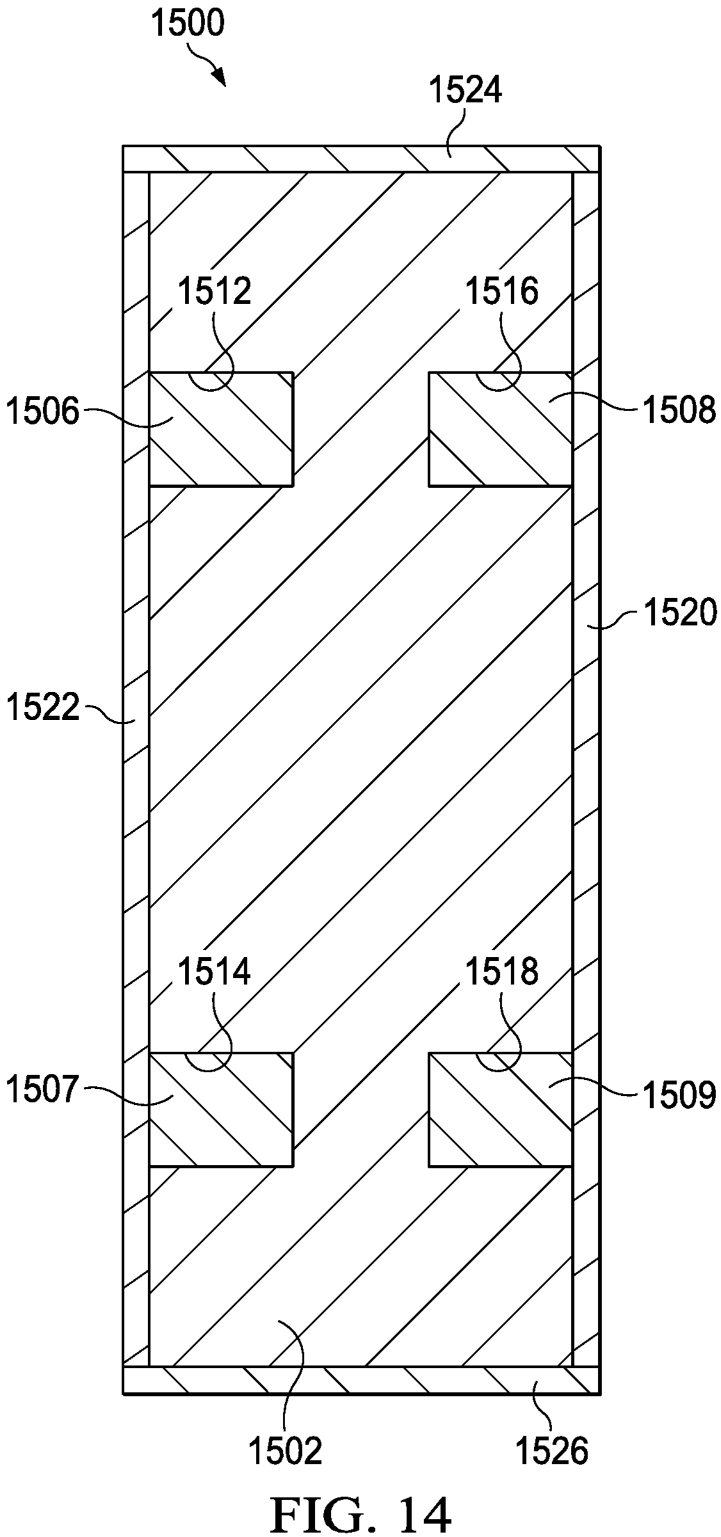
FIG. 14 is a cross-sectional view of a magnetic bar of a preferred embodiment.

Referring to FIG. 14, an alternate embodiment of magnetic bar 1500, will be described. Magnetic bar 1500 includes integrated core 1502. Core 1502 further comprises longitudinal channels 1512, 1514, 1516 and 1518. Channels 1512, 1514, 1516 and 1518 are generally parallel. Magnet row 1506 is positioned in channel 1512. Magnet row 1507, is positioned in channel 1514. Magnet row 1508 is positioned in channel 1516. Magnet row 1509 is positioned in channel 1518. The magnets in each magnet row alternate in polarity orientation, as will be further described. The sides of the beam are covered by side laminates 1520 and 1522. The top and the bottom of the beam are covered by top laminate 1524 and bottom laminate 1526, respectively.

Figure 15A:
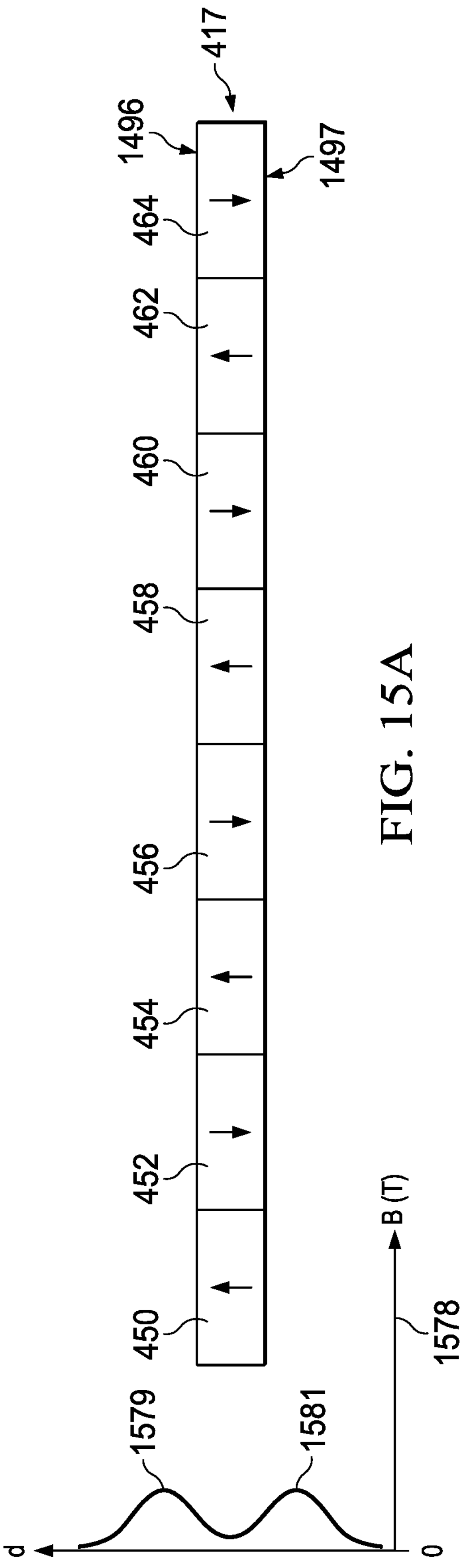
FIG. 15A is a schematic top view of a magnet row of a preferred embodiment.

Referring to FIG. 15A, a top view of magnet row 417 will be further described. Magnet row 417 comprises an array of magnets with alternating polarity. Magnets 450, 454, 458 and 462 are positioned so that their north poles are left facing, with respect to front panel 208. Magnets 452, 456, 460 and 464 are positioned so that their north poles are right facing with respect to front panel 208.

Graph 1578 shows the relative magnetic field density, in Tesla, with respect to distance across the magnet row. The graph shows local maxima 1579 and 1581, adjacent left magnet row face 1496 and right magnet row face 1497, respectively.

Figure 15B:
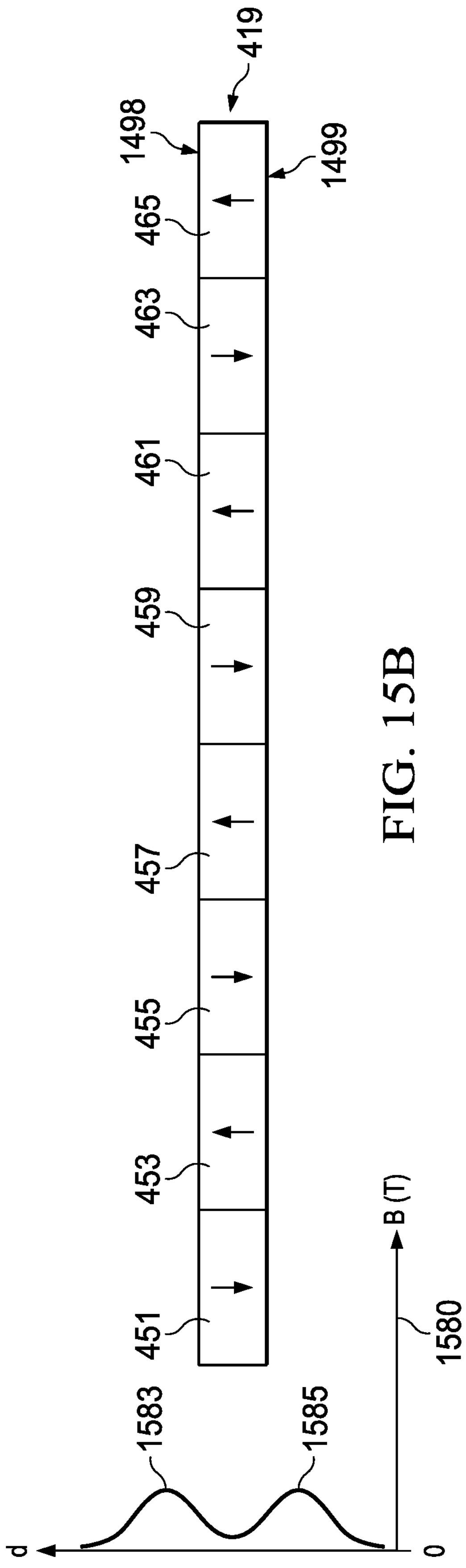
FIG. 15B is a schematic top view of a magnet row of a preferred embodiment.

Referring to FIG. 15B, a top view of magnet row 419 will be further described. Magnet row 419 comprises an array of magnets with alternating polarity which is opposite to the alternating polarity of magnet row 417. Magnets 1451, 1455, 1459 and 1463 are positioned so that their north poles are right facing, with respect to front panel 208. Magnets 1453, 1457, 1461 and 1465 are positioned so that their north poles are left facing with respect to front panel 208.

Graph 1580 shows a relative magnetic field density, in Tesla, with respect distance across the magnet row. The graph shows a local maxima 1583 and 1585 adjacent left magnet row face 1498 and right magnet row face 1499, respectively.

The maxima indicated in the graphs shows that the arrays increases the magnetic field density immediately left and immediately right of magnetic bar. The varying strength of the magnetic field relative to the magnet rows is important because it increases the attraction of the magnetic bar to metallic knives, thereby greatly stabilizing the knives when the pullout mechanism is deployed, while at the same time decreasing the likelihood of magnetization of the metallic knives during prolonged storage periods.

Figure 15C:
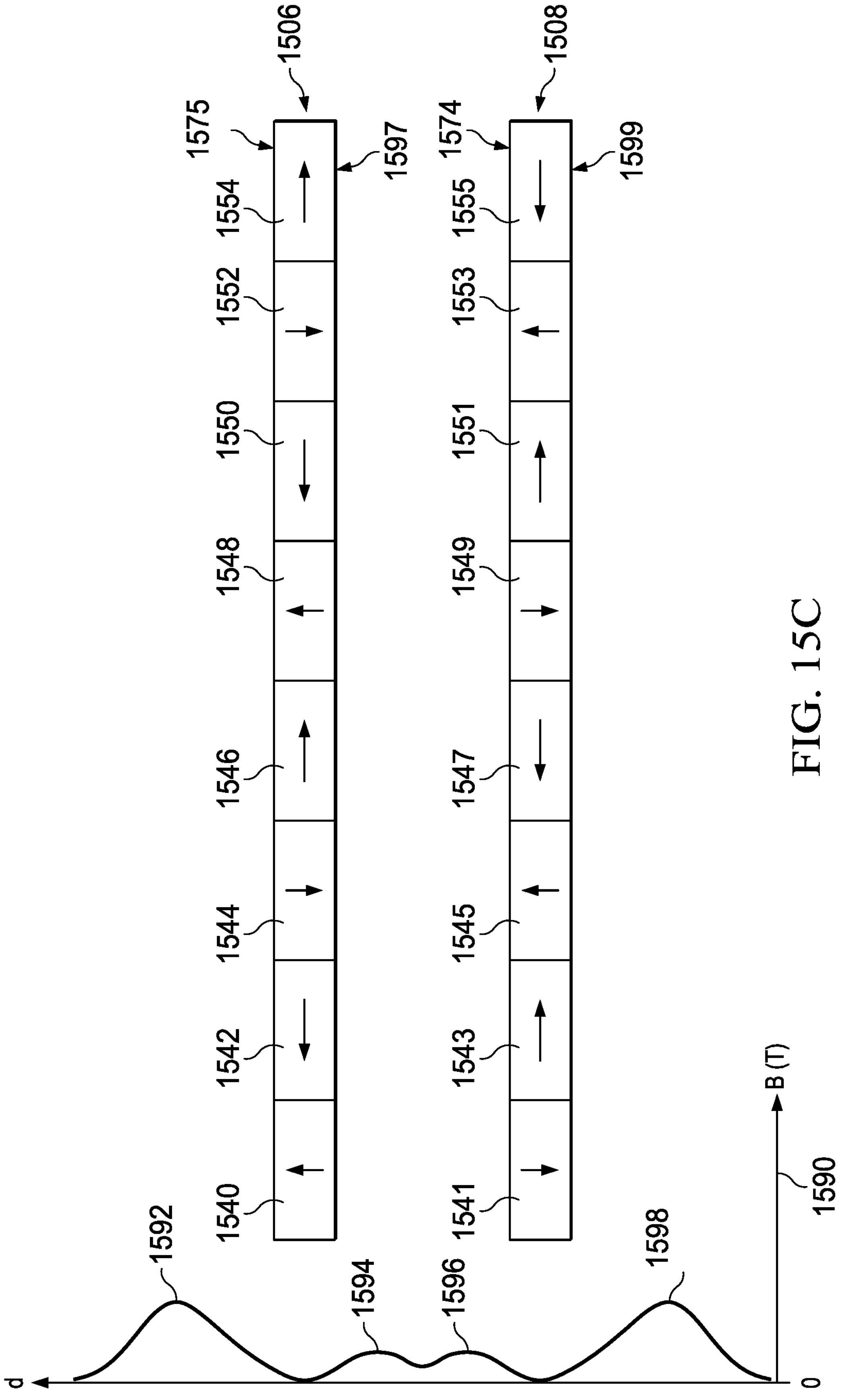
FIG. 15C is a paired set of magnet rows of a preferred embodiment.

Referring to FIG. 15C, a top view of magnet rows 1506 and 1508 will be further described. The magnets in each of magnet rows 1506 and 1508 form separate outwardly biased Halbach arrays.

As to magnet row 1506, magnets 1540 and 1548 positioned with their north poles right facing with respect to front panel 208. Magnets 1542 and 1550 positioned with their north poles facing back to front. Magnet 1544 and 1552 positioned with their north poles left facing to right with respect to front panel 208. Magnets 1546 and 1554 positioned with their north poles facing front to back.

As to magnet row 1508, magnets 1541 and 1549 positioned with their north poles right facing with respect to panel 208. Magnets 1543 and 1551 positioned with their north poles facing front to back. Magnets 1545 and 1553 positioned with their north poles facing with respect to front panel 208. Magnets 1547 and 1555 positioned with their north poles facing from back to front.

Referring to graph 1590, a graph of magnetic field density, B, in Tesla, versus distance across the magnetic bar is described. The graph indicates a local maxima 1592, adjacent left magnet row face 1575. Graph 1590 further indicates a maxima, 1598 adjacent right magnet face 1599. Graph 1590 further indicates a reduced maxima 1594 adjacent right magnet row face 1597. Graph 1590 further indicates a reduced maxima 1596 adjacent left magnet row face 1574. Graph 1590 further indicates that maxima 1592 and 1598 are approximately three times the size maxima 1594 and 1596, thereby indicating that the magnetic field density is much higher to the left of magnet row 1506 and to the right of magnet row 1508, than it is between them. This result is important because the greatly increased magnetic field to the left and to the right of the magnetic bar maximizes the attraction of the magnetic bar to the metallic knives, while simultaneously greatly reducing the likelihood of magnetization of the knives due to prolonged proximity with the magnetic bars.

Figure 16:
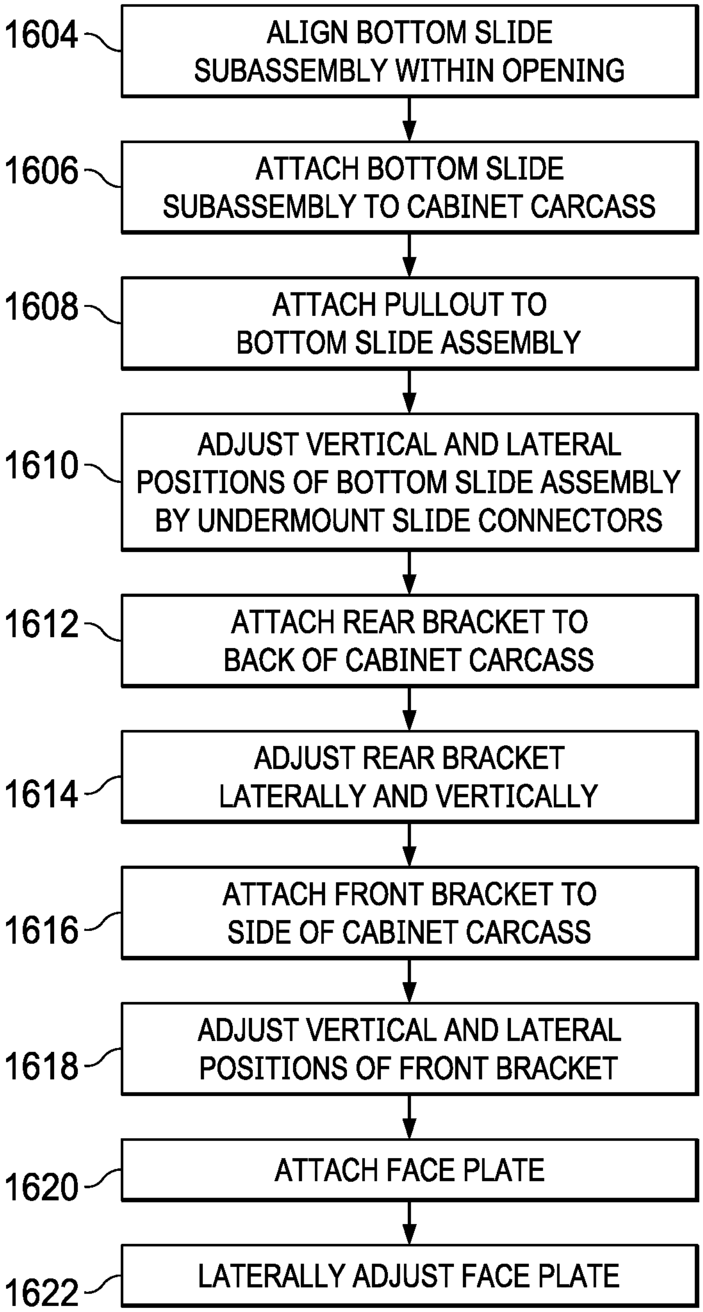
FIG. 16 is a flowchart of a preferred embodiment of a method of installation.

Referring to FIG. 16, at step 1604, the bottom slide subassembly is aligned within the cabinet carcass such that it is centered in the cabinet opening.

At step 1606, the bottom slide subassembly is attached to the bottom of the cabinet carcass by screws inserted through the plurality of slots 1312 and 1322.

At step 1608, the bottom shelf is attached to the bottom slide assembly. The undermount drawer slides of the bottom subassembly engage the slide connectors attached to the bottom shelf.

At step 1610, the vertical and lateral position of the bottom slide assembly is adjusted for vertical depth and lateral placement with the undermount slide connectors as disclosed in U.S. Pat. No. 9,782,001 to McGregor.

At step 1612, the rear bracket is attached to the back wall of the cabinet carcass.

At step 1614, the rear bracket is then adjusted vertically and laterally before tightening the screws in the holes to fix the position of the rear bracket with respect to the cabinet carcass.

At step 1616, the front bracket is attached to the cabinet carcass.

At step 1618, the front bracket is then adjusted vertically and laterally before tightening the screws in the holes to fix the position of the top slide with respect to the cabinet carcass.

At step 1620, the face plate is attached to the face plate mount brackets, to conceal the pullout mechanism.

At step 1622, the face plate is adjusted laterally as described in U.S. Pat. No. 10,251,480 to Chen.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:

1. A storage drawer for concealed placement in a cabinet carcass comprising:

a base frame;

a set of linear slides, attached to the base frame;

a bottom shelf, removably attached to the set of linear slides;

a front panel and a rear panel fixed to the bottom shelf;

a storage assembly, fixed between the front panel and the rear panel, having a top shelf;

a longitudinally oriented magnet bar fixed in the top shelf, wherein the longitudinally oriented magnet bar includes a front side and a back side, and the front side comprises a first magnet access surface and the back side comprises a second magnet access surface;

a first access slot, adjacent the front side and a second access slot adjacent the back side, positioned in the top shelf;

a longitudinal mounting bay, adjacent the top shelf; and, a horizontally oriented stabilizer slide, attached to the storage assembly, in the longitudinal mounting bay, and adjustably attached to the cabinet carcass.

2. The storage drawer of claim 1 wherein the storage assembly further comprises:

a set of vertically oriented canisters, removably supported by the top shelf, adjacent the first access slot.

3. The storage drawer of claim 2 wherein the storage assembly further comprises:

a third access slot, adjacent the set of vertically oriented canisters and adjacent the horizontally oriented stabilizer slide.

4. The storage drawer of claim 3 wherein the storage assembly further comprises:

a flexible retainer, having a plurality of aligned serpentine slots, supported in the top shelf.

5. A storage drawer for concealed placement in a cabinet carcass comprising:

a base frame;

a set of linear slides, attached to the base frame;

a bottom shelf, removably attached to the set of linear slides;

a front panel and a rear panel fixed to the bottom shelf;

a storage assembly, fixed between the front panel and the rear panel, having a top shelf;

a longitudinally oriented magnet bar fixed in the top shelf;

a first access slot and a second access slot, positioned in the top shelf, adjacent the longitudinally oriented magnet bar;

a longitudinal mounting bay, adjacent the top shelf;

a horizontally oriented stabilizer slide, attached to the storage assembly, in the longitudinal mounting bay, and adjustably attached to the cabinet carcass;

a set of vertically oriented canisters, removably supported by the top shelf, adjacent the first access slot;

a third access slot, adjacent the set of vertically oriented canisters and adjacent the horizontally oriented stabilizer slide;

a rubber retainer, having a plurality of aligned serpentine slots, supported in the top shelf; and, a first removable planar liner, positioned below the rubber retainer, at a first level above the bottom shelf.

6. The storage drawer of claim 5 wherein the storage assembly further comprises:

a second removable planar liner, positioned below the longitudinally oriented magnet bar, at a second level above the bottom shelf.

7. The storage drawer of claim 6 wherein the first level is above the second level.

8. The storage drawer of claim 1 wherein the horizontally oriented stabilizer slide is fixed to the cabinet carcass by an adjustable front bracket and an adjustable rear bracket.

9. The storage drawer of claim 8 wherein the adjustable front bracket further comprises:

a first vertical adjustment slot, adjacent the cabinet carcass, and a first lateral adjustment slot, adjacent the horizontally oriented stabilizer slide.

10. The storage drawer of claim 9 wherein the adjustable rear bracket further comprises:

a second vertical adjustment slot, adjacent the cabinet carcass;

a second lateral adjustment slot, adjacent the cabinet carcass; and, a centrally aligned floating longitudinal connection to the horizontally oriented stabilizer slide.

11. The storage drawer of claim 1 wherein the longitudinally oriented magnet bar further comprises:

a set of magnet rows.

12. The storage drawer of claim 11 wherein the set of magnet rows further comprises:

a first magnet row having a plurality of discrete magnets.

13. The storage drawer of claim 12 wherein the plurality of discrete magnets forms an outwardly biased Halbach array.

14. The storage drawer of claim 12 wherein the plurality of discrete magnets forms an alternating polarity array.

15. The storage drawer of claim 1 further comprising:

a plurality of lateral adjustment brackets, attached to the front panel;

a face plate, attached to the plurality of lateral adjustment brackets adjacent the cabinet carcass.

16. The storage drawer of claim 1 wherein the base frame further comprises:

a set of latitudinal base brackets, fixed to the set of linear slides;

at least one latitudinal slot, in at least one latitudinal base bracket of the set of latitudinal base brackets, for lateral adjustment of the base frame, relative to the cabinet carcass.

17. The storage drawer of claim 1 wherein the bottom shelf further comprises:

a pair of longitudinal side walls; and, a pair of outwardly angled longitudinal side rails, fixed to the pair of longitudinal side walls.

* * * * *